(12) United States Patent
Murphy et al.

(10) Patent No.: US 11,755,994 B2
(45) Date of Patent: Sep. 12, 2023

(54) DETERMINING PICK PALLET BUILD OPERATIONS AND PICK SEQUENCING

(71) Applicant: Lineage Logistics, LLC, Irvine, CA (US)

(72) Inventors: Thomas Eugene Murphy, San Francisco, CA (US); Daniel Thomas Wintz, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 17/330,328

(22) Filed: May 25, 2021

(65) Prior Publication Data

US 2022/0383254 A1 Dec. 1, 2022

(51) Int. Cl.
  *G06Q 10/0875* (2023.01)
  *G06Q 10/0631* (2023.01)

(52) U.S. Cl.
  CPC ... *G06Q 10/0875* (2013.01); *G06Q 10/06316* (2013.01)

(58) Field of Classification Search
  CPC .... G06Q 10/08; G06Q 50/28; G06Q 10/0875; G06Q 10/06316
  See application file for complete search history.

(56) References Cited

U.S. PATENT DOCUMENTS

| 2008/0052236 A1* | 2/2008 | Narayanaswami | G06Q 10/087 705/44 |
| 2008/0131255 A1 | 6/2008 | Hessler et al. | |
| 2012/0158385 A1* | 6/2012 | Arunapuram | G06Q 10/083 703/6 |
| 2013/0173051 A1* | 7/2013 | Bellante | G05B 19/4182 700/230 |

FOREIGN PATENT DOCUMENTS

| WO | WO 2017059140 | 4/2017 |
| WO | WO 2018038816 | 3/2018 |

OTHER PUBLICATIONS

"Application Help for SAP Extended Warehouse Management Add-On for Consumer Products for SAP S/4HANA", 2018, available at https://help.sap.com/doc/072343fae4454380a6cfa5ed8310466a/1.0%20SP02/en-US/App_Help_EWMCPS4_1.0_SP01_FP02.pdf, hereinafter "SAP" (Year: 2018).*

(Continued)

*Primary Examiner* — Allen C Chein
(74) *Attorney, Agent, or Firm* — Barnes & Thornburg LLP

(57) ABSTRACT

Methods and systems for determining a pallet build sequence include receiving a pick order request, identifying candidate pick items in a warehouse to fulfill the request, grouping the items based on aisles and generating aisle-based lists per group, and sorting each list based on location of each of the items per group from front to back of the warehouse. For each list, the method includes selecting a first item at a top of the list, adding the first item to a bottom layer of a pallet, determining an amount of weight of items from the list that can be layered on top of the first item and determining whether the first item can support the determined amount of weight. If the first item can support the determined weight, the first item can be kept in a pick sequence as the pallet's bottom layer and removed from the list.

20 Claims, 14 Drawing Sheets

(56) References Cited

OTHER PUBLICATIONS

Massood (Masood, S H; Khan, Hussain A., "Development of pallet pattern placement strategies in robotic palletization", Assembly Automation; Bedford vol. 34, Iss. 2, (2014)) is an overview of robot palletization strategies. (Year: 2014).*

Mazouz (Mazouz, Kader, "Expert System For Flexible Palletizing of Mixed Size and Weight Parcels" Proceedings of SPIE, 1987) is an overview of palletization strategies. (Year: 1987).*

Lim (Lim, Andrew, "An iterated construction approach with dynamic prioritization for solving the container loading problems", Expert Systems with Applications 39, 2012) discloses a dynamically updating container loading strategy. (Year: 2012).*

Reference Carpenter (Carpenter, "Practical Considerations of the Pallet-Loading Problem", J. Opl Res. Soc. vol. 36, No. 6, pp. 489-497, 1985) (Year: 1985).*

International Search Report and Written Opinion in International Appln. No. PCT/US2022/030950, dated Sep. 9, 2022, 15 pages.

* cited by examiner

Item Information 318

| SKU | Layer Strength | Layer Weight | Layer Height | Number of Items per Layer |
|---|---|---|---|---|
| A | 1,000 lb | 250 lb | 12" | 10 |
| B | 400 lb | 100 lb | 15" | 20 |
| C | 200 lb | 100 lb | 20" | 8 |
| D | 750 lb | 250 lb | 15" | 10 |

Candidate Items

320A

| SKU | Quantity |
|---|---|
| A | 10 |
| B | 20 |
| C | 24 |
| D | 10 |

320B

| SKU | Quantity |
|---|---|
| A | 10 |
| C | 24 |
| D | 10 |
| B | 20 |

320C

| SKU | Quantity |
|---|---|
| C | 24 |
| D | 10 |
| B | 20 |

320D

| SKU | Quantity |
|---|---|
| C | 24 |
| D | 10 |
| B | 20 |

320E

| SKU | Quantity |
|---|---|
| C | 24 |
| B | 20 |

(A) Sort items front to back — 326

(B) Add item in front to pallet — 328

(C) Able to add C below A? — 330

(D) Able to add D below A? — 332

(E) Build second pallet — 334

Pallet Pick Order

322A

| SKU | Quantity |
|---|---|
|  |  |

322B

| SKU | Quantity |
|---|---|
|  |  |

322C

| SKU | Quantity |
|---|---|
| A | 10 |

322D

| SKU | Quantity |
|---|---|
| C | 24 |
| A | 10 |

322E

| SKU | Quantity |
|---|---|
| D | 10 |
| A | 10 |

324A

| SKU | Quantity |
|---|---|
| B | 20 |
| C | 24 |

FIG. 3B

Candidate Items

522A

| SKU | Layer Type |
|---|---|
| A | Partial |
| B | Full |
| C | Partial |
| D | Full |
| E | Scoop and Go |

(A) 526 Identify scoop and go opportunity (B) 528 Move full layer items to top of list Pallet Pick Order

522B

| SKU | Layer Type |
|---|---|
| B | Full |
| D | Full |
| A | Partial |
| C | Partial |

524A

| Pallet #1 | |
|---|---|
| SKU | Layer Type |
| E | Scoop and Go |

(C) 530 Sort within groupings

522C

| SKU | Layer Type |
|---|---|
| D | Full |
| B | Full |
| A | Partial |
| C | Partial |

(D) 532 Determine pick sequence

524B

| Pallet #1 | |
|---|---|
| SKU | Layer Type |
| E | Scoop and Go |
| B | Full |
| D | Full |
| C | Partial |
| A | Partial |

FIG. 5C

DETERMINING PICK PALLET BUILD OPERATIONS AND PICK SEQUENCING

TECHNICAL FIELD

This document describes devices, systems, and methods related to pallet build sequencing determinations.

BACKGROUND

A warehouse or other storage facility can be used to store items. Items can be stored for different periods of time and under different storage conditions, which can be based on a vendor, customer, or other relevant user. Items can be stored until they are requested by a relevant user. A customer can, for example, request certain items to be picked and shipped to the customer within a predetermined timeframe. The customer can request items of a same type and/or items of different types. When the customer requests items in a pick order request, the customer can also indicate quantities of each item that are being requested.

When the pick order request is received at the warehouse, warehouse workers can work to fulfill that request. The warehouse workers can determine an order to pick the requested items. Sometimes, the pick order can be random. Sometimes, the pick order can be based on locations of the items relative to each other in the warehouse. When the warehouse workers pick the items, they often times may travel around to different storage rooms and/or aisles in the warehouse to get all the items in the pick order request. This travel can require significant amounts of labor, energy, and time, especially if the warehouse worker is moving a heavy pick pallet around the warehouse to collect all the items in the request. It can take a long time to fulfill the pick order request. Moreover, the pick pallet can contain all the requested items, but some of the items can be damaged or crushed based on an order that the items are picked and stacked on the pick pallet. The warehouse worker may not be aware of how much weight certain items can support, especially if the warehouse worker is rushing to complete the pick order request in time, and therefore the worker can stack heavy items on top of items that may not be able to support such weight. The resulting pick pallet may not be structurally sound. Moreover, the customer can receive damaged items, which can cause dissatisfaction with the warehouse.

SUMMARY

The document relates to determining efficient pick pallet build operations in a warehouse environment that can balance a variety of competing objectives, such as labor efficiency in building pick pallets, the pallet's structural integrity, and avoiding the possibility of building pallets that may result in items being damaged (i.e., items at bottom of pallet being crushed by heavy items on top level of pallet). The disclosed technology can also provide for splitting pick orders into individual pallets and determining pick sequences for items on a pallet in a manner that optimizes labor efficiency and that results in structurally sound pick pallets. Pick pallets can be structurally sound when items are stacked on top of each other without causing items in lower layers to be crushed or otherwise damaged.

A forklift or warehouse worker can move from a back of a warehouse to a front of the warehouse. As the forklift moves from back to front, the forklift can pick up items or layers of items and place them on a pallet to build a pick pallet that fulfills a pick order request. Thus, a first item or layer of items that is picked for a base of the pallet can be located at the back of the warehouse and a top item or layer of items that is picked can be located at the front of the warehouse. The disclosed technology can provide for determining an optimal pick sequence by analyzing items or layers of items in reverse, from the front of the warehouse to the back of the warehouse. As a result, the disclosed technology can provide for determining whether layers of items are able to support weight of layers that are added on top. If the layers can support the added weight, then the layers are less likely to be crushed or otherwise damaged. Thus, a more structurally sound pallet can be built.

Input can include a quantity of items (e.g., cases) of each product that a requesting user needs in their pick order request. A goal of the disclosed technology can be to receive this input and determine how many pallets need to be made to satisfy the request, how to groups the pallet builds in a way that's most efficient for a warehouse worker, and how to build pallets that are structurally sound. As a result, more labor and energy efficient pallets can be built to satisfy pick order requests. One or more pallets can be built per aisle, thereby reducing an amount of distance, time, and energy needed to build the pallets. A first item in the aisle can be selected, and added to a bottom of the pallet. The disclosed technology can then provide for trying to add a next item in the aisle on top of the bottom layer and determining whether the added item would crush the bottom item. If the added item would not crush the bottom item, then the added item can remain in the pallet build sequence and a next item in the aisle can be selected to perform the same analysis. If the added item would crush the bottom item, then a next item in the aisle can be selected to determine whether this item would crush the bottom item. This can be an iterative decision-making process used to determine an optimal yet efficient pallet build sequence. Any pallets built per aisle that are not full can then be combined into single pallet builds.

The disclosed technology can apply to both manual and automated warehouses. Optimal pick sequencing can be determined in order to efficiently use labor in the warehouse environment and build solid pick pallets that may not break or fall apart. The disclosed technology can be used to determine how to construct a pallet and where to pick items from in order to construct such pallet. Ordering of items to pick can also be optimized. Full layers can be picked first and used as base or bottom layers on the pallet. This can be a scoop and go opportunity. Other items in a pick request that are physically closest to the picked full layer(s) can be considered next in determining how to build the pallet. The items in the pick request can be analyzed for whether they have the ability to support a layer that is placed on top while also satisfying height requirements for the pallet.

Although the disclosed inventive concepts include those defined in the attached claims, it should be understood that the inventive concepts can also be defined in accordance with the following embodiments.

Embodiment 1 is a method for determining a pallet build sequence, the method comprising: receiving, by a computing system, a pick order request, wherein the pick order request includes a list of items to be picked and a quantity of each of the items to be picked; identifying, by the computing system and based on the pick order request, candidate pick items in a warehouse environment that can be used to fulfill the pick order request; grouping, by the computing system, the identified candidate pick items based on aisles; generating, by the computing system, aisle-based lists for each of the groups of identified candidate pick items; sorting, by the computing system, each of the aisle-based lists based on a location of each of the identified candidate pick items in each of the groups relative to a front of the warehouse, wherein a first candidate pick item closest to the front of the warehouse is put at a top of the aisle-based list; for each of the aisle-based lists: selecting, by the computing system, a first candidate pick item at the top of the aisle-based list; adding, by the computing system, the first candidate pick item to a bottom layer of a pallet; retrieving, by the computing system, strength information of the first candidate pick item; determining, by the computing system, an amount of weight of candidate pick items from the aisle-based list that can be layered on top of the first candidate pick item; determining, by the computing system, whether the first candidate pick item is able to support the determined amount of weight based on the determined amount of weight being less than the strength information; in response to determining that the first candidate pick item is able to support the determined amount of weight, keeping, by the computing system, the first candidate pick item in a pick sequence as the bottom layer of the pallet and removing the first candidate pick item from the aisle-based list; and in response to determining that the first candidate pick item is not able to support the determined amount of weight, removing, by the computing system, the first candidate pick item from the pick sequence as the bottom layer of the pallet and keeping the first candidate pick item on the aisle-based list.

Embodiment 2 is the method of embodiment 1, further comprising: receiving, by the computing system and from a warehouse vehicle, a request for a new task; and transmitting, by the computing system and to the warehouse vehicle, the pick sequence for each of the pallets to build, wherein the pick sequence lists candidate items to be picked in an order from a back of the warehouse to the front of the warehouse.

Embodiment 3 is the method any one of the embodiments 1 through 2, further comprising determining, by the computing system and based on the sorted aisle-based list, a number of pallets to build per aisle.

Embodiment 4 is the method of any one of the embodiments 1 through 3, wherein the strength information includes a maximum weight load that the first candidate pick item can support without being crushed.

Embodiment 5 is the method of any one of the embodiments 1 through 4, wherein the maximum weight load is determined, by the computing system and based on: receiving a pallet of the first candidate pick item from a supplier; identifying a number of layers of the first candidate pick item on the pallet; identifying a weight for each layer on the pallet; determining a supplier-provided load on a bottom layer of the pallet, wherein the supplier-provided load is the weight for each layer multiplied by one less than the number of layers on the pallet; and determining the maximum weight load based on applying a margin threshold multiplier to the supplier-provided load.

Embodiment 6 is the method of any of the embodiments 1 through 5, wherein the margin threshold multiplier is 1.2.

Embodiment 7 is the method of any of the embodiments 1 through 6, further comprising, in response to determining that the first candidate pick item is able to support the determined amount of weight: selecting, by the computing system, a second candidate pick item at the top of the aisle-based list; adding, by the computing system, the second candidate pick item to the bottom layer of the pallet beneath the first candidate pick item; retrieving, by the computing system, strength information of the second candidate pick item; determining, by the computing system, an amount of weight of candidate pick items from the aisle-based list that can be layered on top of the first candidate pick item; determining, by the computing system, whether the second candidate pick item is able to support a weight of the first candidate pick item; in response to determining that the second candidate pick item is able to support the weight, keeping, by the computing system, the second candidate pick item in the pick sequence as the bottom layer of the pallet and removing the second candidate pick item from the aisle-based list; and in response to determining that the second candidate pick item is not able to support the weight, removing, by the computing system, the second candidate pick item from the pick sequence as the bottom layer of the pallet and keeping the second candidate pick item on the aisle-based list.

Embodiment 8 is the method of any of the embodiments 1 through 7, wherein the first candidate pick item is closest to the front of the warehouse.

Embodiment 9 is the method of any of the embodiments 1 through 8, further comprising: determining, by the computing system, whether the pallet having the first candidate pick item as the bottom layer exceeds a height threshold; in response to determining that the pallet exceeds the height threshold, removing, by the computing system, the first candidate pick item from the pick sequence as the bottom layer and keeping the first candidate pick item in the aisle-based list; and in response to determining that the pallet does not exceed the height threshold, keeping, by the computing system, the first candidate pick item in the pick sequence as the bottom layer and removing the first candidate pick item from the aisle-based list.

Embodiment 10 is the method of any of the embodiments 1 through 9, wherein the height threshold is 60 inches.

Embodiment 11 is the method of any of the embodiments 1 through 10, further comprising: determining, by the computing system, whether pick sequences are generated for partial pallets based on the aisle-based lists; and in response to determining that pick sequences are generated for partial pallets, generating, by the computing system, instructions to combine one or more of the partial pallets.

Embodiment 12 is the method of any of the embodiments 1 through 11, further comprising: identifying, by the computing system and for each of the aisle-based lists, a scoop and go candidate pick item that has at least a minimum threshold quantity of the candidate pick item to fulfill the pick order request; moving, by the computing system, the scoop and go candidate pick item to the pick sequence as the bottom layer of the pallet; removing, by the computing system, the scoop and go candidate pick item from the aisle-based list; identifying, by the computing system, first items in the aisle-based list that are full layers; identifying, by the computing system, second items in the aisle-based list that are partial layers; moving, by the computing system, the first items to the top of the aisle-based list; moving, by the computing system, the second items to an end of the aisle-based list; sorting, by the computing system, the first items based on location from the front to a back of the warehouse; sorting, by the computing system, the second items based on location from the front to the back of the warehouse; and determining, by the computing system and for each of the first items and the second items, first and second orders in which the first and second items can be picked to build the pallet having the scoop and go candidate pick item as the bottom layer.

Embodiment 13 is the method of any of the embodiments 1 through 12, wherein the minimum threshold quantity of the candidate pick item comprises a current available quantity on a source pallet for the candidate pick item having half or more of a pick quantity for the candidate pick item in the pick order request.

Embodiment 14 is the method of any of the embodiments 1 through 13, further comprising: identifying, by the computing system, a plurality of scoop and go candidate pick items from a plurality of source pallets; and selecting, by the computing system, one of the plurality of scoop and go candidate pick items based at least in part on the selected scoop and go candidate pick item having a greatest quantity of the scoop and go candidate pick item on a source pallet from amongst the source pallets for the plurality of scoop and go candidate pick items.

Embodiment 15 is a system for determining a pallet build sequence, the system comprising: one or more processors; and memory storing instructions, that when executed by the one or more processors, cause the one or more processors to perform operations comprising: receiving a pick order request, wherein the pick order request includes a list of items to be picked and a quantity of each of the items to be picked; identifying, based on the pick order request, candidate pick items in a warehouse environment that can be used to fulfill the pick order request; grouping the identified candidate pick items based on aisles; generating aisle-based lists for each of the groups of identified candidate pick items; sorting each of the aisle-based lists based on a location of each of the identified candidate pick items in each of the groups relative to a front of the warehouse, wherein a first candidate pick item closest to the front of the warehouse is put at a top of the aisle-based list; for each of the aisle-based lists; selecting a first candidate pick item at the top of the aisle-based list; adding the first candidate pick item to a bottom layer of a pallet; retrieving strength information of the first candidate pick item; determining an amount of weight of candidate pick items from the aisle-based list that can be layered on top of the first candidate pick item; determining whether the first candidate pick item is able to support the determined amount of weight based on the determined amount of weight being less than the strength information; in response to determining that the first candidate pick item is able to support the determined amount of weight, keeping the first candidate pick item in a pick sequence as the bottom layer of the pallet and removing the first candidate pick item from the aisle-based list; and in response to determining that the first candidate pick item is not able to support the determined amount of weight, removing the first candidate pick item from the pick sequence as the bottom layer of the pallet and keeping the first candidate pick item on the aisle-based list.

Embodiment 16 is the system of embodiment 15, wherein the operations further comprise: receiving, from a warehouse vehicle, a request for a new task; and transmitting, to the warehouse vehicle, the pick sequence for each of the pallets to build, wherein the pick sequence lists candidate items to be picked in an order from a back of the warehouse to the front of the warehouse.

Embodiment 17 is the system of any of the embodiments 15 or 16, wherein the operations further comprise determining, based on the sorted aisle-based list, a number of pallets to build per aisle.

Embodiment 18 is the system of any of the embodiments 15 through 17, wherein the strength information includes a maximum weight load that the first candidate pick item can support without being crushed.

Embodiment 19 is the system of any of the embodiments 15 through 18, wherein the operations further comprise determining the maximum weight load based on: receiving a pallet of the first candidate pick item from a supplier; identifying a number of layers of the first candidate pick item on the pallet; identifying a weight for each layer on the pallet; determining a supplier-provided load on a bottom layer of the pallet, wherein the supplier-provided load is the weight for each layer multiplied by one less than the number of layers on the pallet; and determining the maximum weight load based on applying a margin threshold multiplier to the supplier-provided load.

Embodiment 20 is the system of any of the embodiments 15 through 19, wherein the operations further comprise, in response to determining that the first candidate pick item is able to support the determined amount of weight: selecting a second candidate pick item at the top of the aisle-based list; adding the second candidate pick item to the bottom layer of the pallet beneath the first candidate pick item; retrieving strength information of the second candidate pick item; determining an amount of weight of candidate pick items from the aisle-based list that can be layered on top of the first candidate pick item; determining whether the second candidate pick item is able to support a weight of the first candidate pick item; in response to determining that the second candidate pick item is able to support the weight, keeping the second candidate pick item in the pick sequence as the bottom layer of the pallet and removing the second candidate pick item from the aisle-based list; and in response to determining that the second candidate pick item is not able to support the weight, removing the second candidate pick item from the pick sequence as the bottom layer of the pallet and keeping the second candidate pick item on the aisle-based list.

The devices, system, and techniques described herein may provide one or more of the following advantages. For example, the disclosed technology can provide for building pick pallets in such a way that is labor and energy efficient. Pallets can be built from the back of the warehouse to the front of the warehouse. Items to build the pallets can be picked in a sequence that may not require the forklift or warehouse worker to backtrack or navigate different aisles, thereby reducing an amount of time and labor needed to build the pallets. Moreover, this can be advantageous to reduce an amount of time that warehouse workers may need to spend inside cold storage area of the warehouse. The disclosed techniques can provide for consolidating orders into fewer pallet builds. As a result, the warehouse workers may enter the cold storage areas once to complete multiple orders rather than multiple times to complete each of the orders. The pallets can also be built faster while using less energy. Instead, a pallet can be built with items that are located within one aisle. Moreover, since the pallet can be built from the back of the warehouse to the front of the warehouse, building can be more energy efficient. This is because the forklift may not be required to transport a heavy pallet over a long distance and/or back and forth through one or more different aisles. A pallet that is initially built at the back of the warehouse can increase in weight as more items closer to the front of the warehouse are added to the pallet. By the time the pallet reaches the front of the warehouse, the pallet can be at a maximum weight load. Thus, although heavy, the pallet does not need to be moved a great distance to a docking area or other destination location that is at the front of the warehouse. Less energy and labor is used to move the built pallet to the destination location.

As another example, the disclosed technology can provide for building structurally sound pallets. The disclosed technology provides for analyzing pallet build sequencing from the front to the back of the warehouse. In other words, analysis is performed in reverse of a direction that the items would actually be picked in real-time to build the pallet. Strength and crushability can be determined for each potential layer that can be built on the pallet. For example, the disclosed technology can provide for starting with a top layer (e.g., items at the front of the warehouse, which would be last to be picked in real-time), adding a layer of items beneath it (e.g., items next from the front of the warehouse), and determining whether the layer beneath would be able to support the top layer without being crushed. When strength and crushability can be assessed for each potential layer, a more structurally sound and strong pallet can be built. The disclosed technology can provide for selecting an aisle that contains items from a pick order request. For that aisle, first items closest to the front of the warehouse can be selected first. Second items can then be selected and added beneath the first items in order to determine whether the second items are able to support weight of the first items without being crushed. Iterative decision-making can be performed to determine whether whatever weight may be borne on top of a bottom layer of the pallet is how much weight the bottom layer can support without being crushed. If the item that would go on the bottom layer cannot support the weight, then another item in the aisle can be selected to determine whether it can be borne by the bottom layer.

The disclosed technology can also be computationally efficient, thereby allowing for more pallet build sequencing decisions to be made in real-time. For example, if there are 10 different items on a pick order, there are 10 factorial (10!=3,628,800) different possible pick and build sequences for a single pallet. Attempting to evaluate each of these pick sequences against each other, including simulation and evaluation of whether they will be structurally sound, efficient, and will avoid crushing items in the pick order, creates a significant computational burden. And this burden is only increased as the number of items on the pick order increases, and as varied groupings of items on different pallets are also considered. Accordingly, the disclosed innovation provides a that is capable of arriving at a good solution that can balances multiple competing factors (i.e., minimize travel and pick time, avoid crushing items, build pallet that is structurally sound and unlikely to tip/lean) in a manner that is computationally efficient and that minimizes the use of computational resources to arrive at the solution. For example, the disclosed innovation can arrive at a solution by considering only a small subset of all possible combinations, and can do so without necessarily comparing solutions against each other. The disclosed technology can permit for pick solutions to be generated in real time and in a highly responsive manner, which can be beneficial in a warehousing system that is handling large volumes of similar requests and that needs to be able to provide responses with low latency to avoid backups within the warehouse.

The details of one or more implementations are set forth in the accompanying drawings and the description below. Other features and advantages will be apparent from the description and drawings, and from the claims.

BRIEF DESCRIPTION OF THE DRAWINGS

FIG. 3B is a block diagram for determining the pick sequence of FIG. 3A.

FIG. 5C is a block diagram for determining the optimal pallet build of FIGS. 5A-B.

Like reference symbols in the various drawings indicate like elements.

DETAILED DESCRIPTION OF ILLUSTRATIVE EMBODIMENTS

This document relates to determining optimal and efficient pick pallet build operations in a warehouse environment. The disclosed technology can provide for building pick pallets on an aisle basis. Less-than-full pallets generated per aisle can then be combined into mixed pallets. The disclosed technology can also provide for minimizing damage or crushing of items that are layered in the pick pallets. Moreover, the disclosed technology can minimize labor required to pick items to build the pallets while also minimizing pick-path lengths.

The disclosed technology can be applied to both manual and automated warehouses. In a manual warehouse, a call to determine a pick pallet build operation can be made at a point that a pick order request is received. This call can populate placeholder tasks in a task queue to allow for labor scheduling and other planning purposes needed to fulfill the pick order request in a timely fashion. Additional calls can be made before a first pick task is performed in order to determine the pick pallet build operation based on latest conditions in the warehouse. The manual pick operation call can return, for each pick pallet to build, (1) a set of SKUs on the pick pallet, (2) for each SKU on the pick pallet, a set of locations that can satisfy the pick (which can also satisfy a first-in-first-out order), (3) an order that items should be picked relative to others, and (4) a number of items that need to be picked of each SKU.

In an automated warehouse (e.g., where there is automatic layer picking and/or a manual pick-to-belt operation), a call to determine a pick pallet build operation can also be made at a point that a pick order request is received. However, in a manual pick operation, each build-order for a single pallet can be distinct from other build lines. In the automated pick operation, all layers that have a same build order can be interchangeable while building the pallet. Thus, output from the automated pick operation call can be different than output from the manual pick operation call. Such flexibility in the automated pick operation call can provide for opportunity to determine a best order in which to execute each layer picker task.

Figure 1:
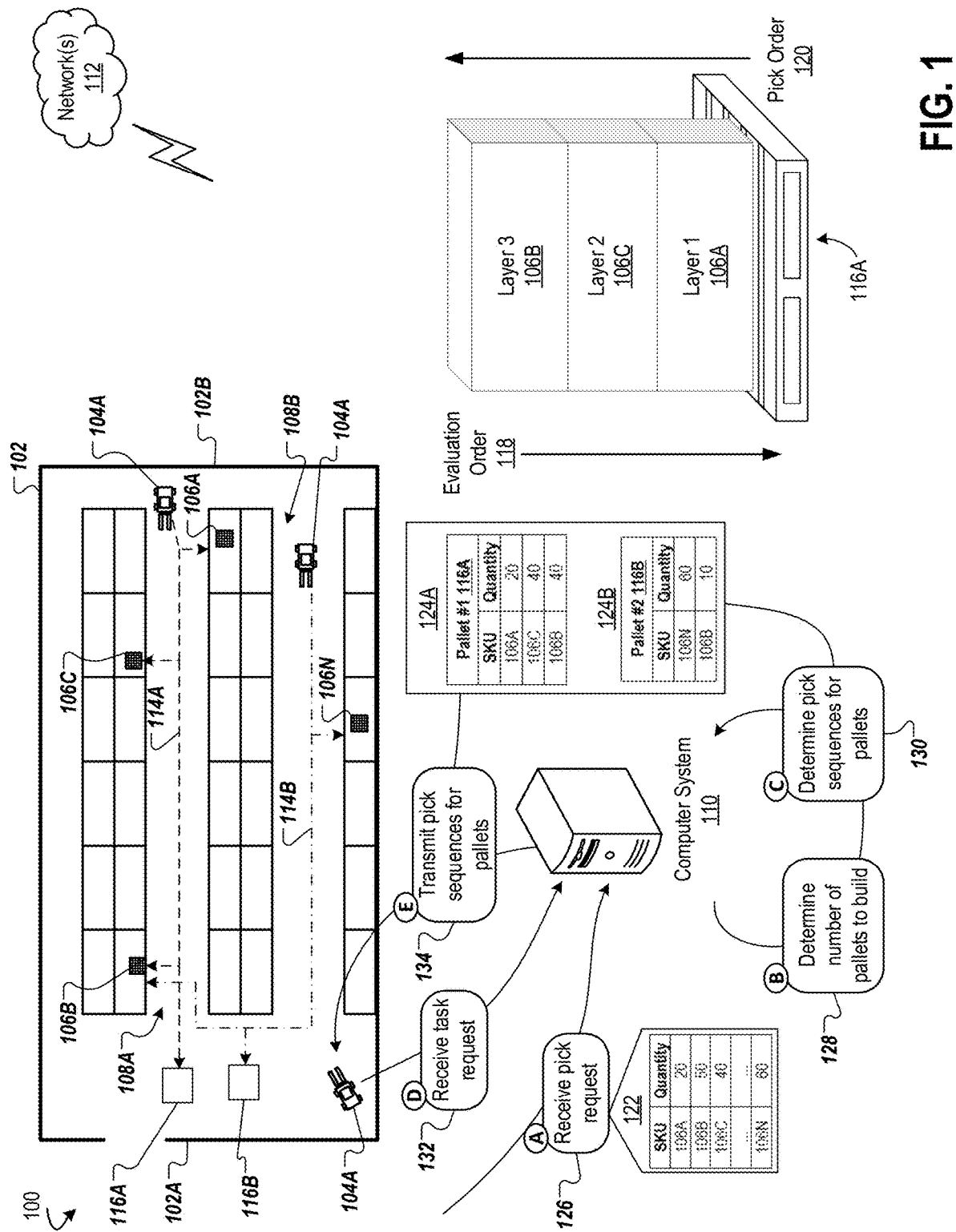
FIG. 1 is a conceptual diagram of a system for determining a pick pallet build operation in a warehouse environment.

Now referring to the figures, FIG. 1 is a conceptual diagram of a system 100 for determining a pick pallet build operation in a warehouse environment. The example warehouse environment 102 shows a current location of various vehicles, such as forklift 104A, as they move throughout the environment 102. The warehouse environment 102 can include various vehicles that are able to move on their own accord (e.g., the forklift 104A, autonomous vehicles, robots), various warehouse workers who perform operations in the environment 102 and/or control vehicles operating in the environment 102, and various movable objects that can be moved throughout the environment 102, such as pallet items 106A-N. The pallet items 106A-N can be stored throughout the environment 102 and accessible via aisles 108A and 108B.

The items 106A-N can be cases, containers, or boxes of items. The items 106A-N can also be full or partial layers of arranged items. The items 106A-N can be stored and accessible by the aisles 108A-B until such items 106A-N are requested by a customer. A customer, such as a restaurant, store, or other business owner, can request one or more of the items 106A-N to be shipped to them. These items 106A-N can be picked by one or more of the vehicle 104A and arranged into outbound pallets 116A and 116B. Once all the requested items 106A-N are picked and stacked on the pallets 116A-B, the pallets 116A-B can be shipped to the customer.

When building the pallets 116A-B, the vehicle 104A can move from a back 102B of the warehouse environment 102 to a front 102A of the warehouse environment 102. As a result, the pallets 116A-B can be complete, and their heaviest, once at the front 102A of the environment 102, making it easier and less energy or time consuming to move the pallets 116A-B to a docking area or outbound transport vehicles (e.g., trucks, shipping containers).

In order to determine how to build the pallets 116A-B, the vehicle 104A communicates with a computer system 110 via network(s) 112. The computer system 110 can be configured to determine optimal pick pallet build operations, as described herein. The computer system 110 can also be part of a warehouse management system (WMS) and/or the computer system 110 can be in communication with the WMS.

The computer system 110 can receive a pick request (step A, 126). The pick request can be transmitted to the computer system 110 via the WMS. The pick request can also be received from a customer computing device (e.g., mobile phone, smartphone, laptop, computer, tablet). The pick request can include information 122. The information 122 can indicate items that are requested by the customer. In the example of FIG. 1, the information 122 indicates item SKU and quantity of each item being requested. Here, the customer requests 20 of item 106A, 50 of item 106B, 40 of item 106C, and 60 of item 106N. The quantities can be measured as number of cases per item, number of layers per item, number of items, or any other quantity metric. Moreover, the requested items may be listed in no particular order in the information 122.

The computer system 110 can then determine a number of pallets to build (step B, 128). This determination can be made such based on which of the items 106A-N are located in each of the aisles 108A-B. For example, one or more pallets can be built per aisle. This can be advantageous to reduce an amount of travel time for the vehicle 104A. The vehicle 104A may not be required to travel between two aisles while carrying a partially built pallet. Traveling between the two aisles to pick items from the pick request can be time and energy consuming. Instead, as described herein, the vehicle 104A can build one or more pallets per aisle to reduce an amount of travel time and energy needed to pick all the items in the pick request.

As shown in FIG. 1, two pallets can be built, pallets 116A and 116B. Pallet 116A can be built for aisle 108A, which includes items 106A, 106B, and 106C. Pallet 116B can be built for aisle 108B, which includes item 106N. The computer system 110 can determine how many pallets to build based on customer preferences, pallet height thresholds, and/or warehouse standards.

Once the computer system 110 determines a number of pallets to build, the computer system 110 can determine pick sequences for the pallets 116A and 116B (step C, 130). The computer system 110 can identify all source items in the warehouse environment 102 that can fulfill the pick order request and prioritize pick line items. In some implementations, the computer system 110 can try to find as few source items as possible that may satisfy the requested quantities in order to be more computationally efficient. The computer system 110 can also group source items that can be picked based on location. Source items that are closer in location to each other can be grouped together such that the vehicle 104A may not have to travel all over the warehouse 102 to collect the items.

As described throughout this disclosure, the pick sequences can be determined such that the items 106A-N are picked from the back 102B of the warehouse environment 102 to the front 102A of the warehouse 102. This can be advantageous to reduce travel time and energy consumption of the vehicle 104A. As a result, the vehicle 104A can pick items to build more outbound pallets, thereby increasing warehouse efficiency. The items 106A-N can also be ordered within the pick sequences based on how much weight each layer of the items 106A-N can support without being crushed. This can be advantageous to avoid damaging any of the items 106A-N that are requested. For example, item 106B can be bread. Bread can support little weight on top of it without being crushed by that weight. Moreover, since the bread is lightweight, the bread can likely be supported by layers of items that are positioned beneath it without crushing those bottom layers. Thus, the computer system 110 can determine that the bread should be placed in a layer on top of other layered items to avoid crushing the bread.

As described further below, the computer system 110 can determine pick sequences by evaluating the items 106A-N in evaluation order 118. The evaluation order 118 can be a top-down, or front 102A to back 102B, evaluation. In other words, the computer system 110 can select the item 106B from the front 102A of the warehouse 102, place that item 106B on the pallet 116A, and determine whether the item 106B will crush item 106C, which is next closest to the front 102A of the warehouse 102 and the next nearest source item, when the item 106C is placed beneath the item 106B. In the bread example mentioned above, if item 106B is bread and item 106C is cartons of eggs, the computer system 110 can determine that the bread will not crush the eggs if the eggs are positioned beneath the eggs. Thus, the item 106B can be a layer 3 of the pallet 116A build and the item 106C can be a layer 2 of the pallet 116A build. The computer system 110 can then check whether positioning the item 106A as a bottom layer will be able to support both items 106B (layer 3) and 106C (layer 2). For example, item 106A can be boxes of cereal. The computer system 110 can determine that item 106A may not be crushed under the weight of both the bread (layer 3) and the eggs (layer 2). Accordingly, the computer system 110 can determine pick sequence 124A for pallet 116A, as shown in FIG. 1.

The pick sequence 124A lists the items to pick in reverse order from the evaluation order 118. Pick order 120 is in reverse order because the items 106A-N are to be picked from the back 102B to the front 102A of the warehouse 102. Picking the items 106A-N from the back 102B to the front 102A can be advantageous to save energy and gain on speed in building the pallets 116A-B. Moreover, it can be more efficient for the vehicle 104A to carry fewer items by traveling from the back 102B to the front 102A. Thus, where the items 106A-N are evaluated from a top-down approach (e.g., the evaluation order 118), the items 106A-B are actually picked from a back-to-front approach (e.g., the pick order 120). The pick sequence 124A lists a quantity of 20 of item 106A to be picked first because item 106A can make up the bottom layer on the pallet 116A and item 106A is at the back 102B of the warehouse 102. 40 of item 106B are to be picked second to make up the second layer of the pallet 116A. Finally, 40 of item 106B are to be picked up last to make the third layer of the pallet 116A, and item 106B is located at the front 102A of the warehouse 102. The vehicle 104A can travel along route 114A to pick the items 106A, 106C, and 106B in order.

As shown in this example, only 40 of the requested 50 of item 106B can be picked for the pallet 116A. This can occur because the computer system 110 may determine that the pallet 116A, as built using the pick sequence 124A, satisfies a pallet height threshold. The pallet height threshold can be 60 inches. Once the pallet height threshold is satisfied, additional items may not be added to the pallet 116A because then the pallet 116A would be too tall. If the pallet 116A exceeds the pallet height threshold, then the pallet 116A may not be structurally sound. Thus, additional items that may still need to be picked can be sequenced for another pallet build, such as the pallet 124B.

In the example of FIG. 1, pick sequence 124B is determined by the computer system 110 for the pallet 116B. This pick sequence 124B indicates that the vehicle 104A can travel along route 114B in aisle 108B to pick up 60 of item 106N, which is closer to the back 102B of the warehouse 102 than the front 102A. The vehicle 104A can then pick up the remaining quantity of item 106B from the aisle 108A, which is at the front 102A of the warehouse 102. Here, the pallet 116B can be built using partial layers, in which the top layer may not be a full layer of the items 106B and the top layer can include a quantity of leftover items 106B that could not fit into the pick sequence 124A for the pallet 116A. Moreover, as described in reference to determining the pick sequence for the pallet 116A, the computer system 110 can determine that the item 106N can support the weight of the item 106B, the bread, and therefore the item 106N can be placed as a bottom layer of the pallet 116B.

Still referring to FIG. 1, the computer system 110 can receive a task request from the vehicle 104A (step D, 132). In some implementations, the computer system 110 can receive the task request at any time while the computer system 110 is performing steps A-C. The task request can indicate that the vehicle 104A has just finished a task in the warehouse environment 102 or is about to finish a task and is ready to complete a new task.

Accordingly, the computer system 110 can transmit the pick sequences 124A and 124B for the pallets 116A and 116B to the vehicle 104A (step E, 134). The vehicle 104A can then build the pallets 116A-B. The pick sequences 124A and 124B that are transmitted to the vehicle 104A can indicate a sequence for picking and building the items 106A-N, which pallets 116A-B the items 106A-N are to be built on, and the routes 114A-B. The vehicle 104A can therefore receive a sequence of steps that can be followed in order to build the pallets 116A-B.

Figure 2:
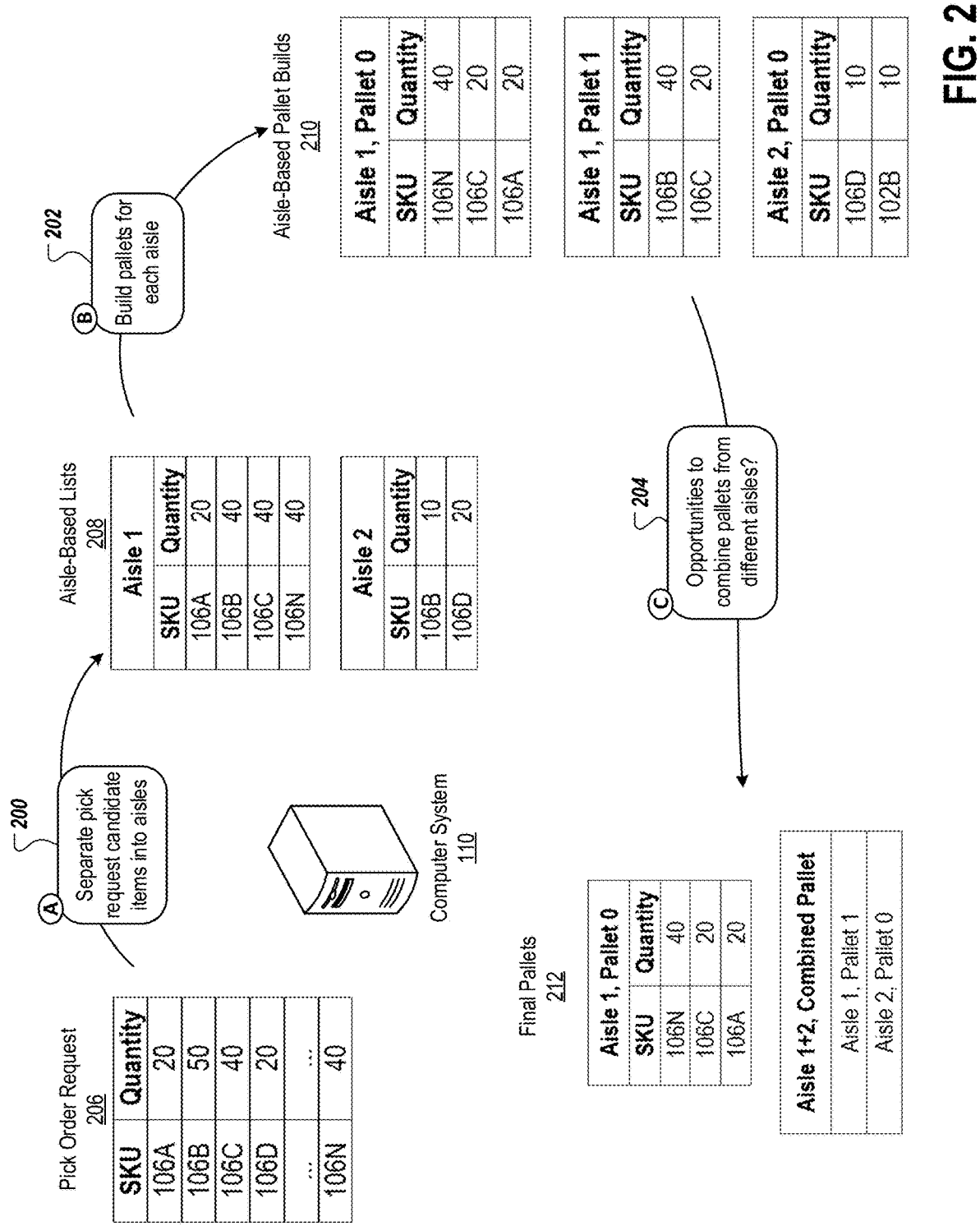
FIG. 2 is a block diagram for determining what pallets to build per aisle in order to fulfill a pick order request.

FIG. 2 is a block diagram for determining what pallets to build per aisle in order to fulfill a pick order request. As described herein, this determination can be made by the computer system 110 (e.g., refer to FIG. 1) or any other similar computing system.

The computer system 110 can receive a pick order request list 206. As described herein, the list 206 includes items identified by their SKUs and quantities requested of each item. Here, the list 206 includes 20 of item 106A, 50 of item 106B, 40 of item 106C, 20 of item 106D, and 40 of item 106N.

Using the list 206, the computer system 110 can separate pick request candidate items into aisles (step A, 200). The computer system 110 can identify candidate items throughout the warehouse that can be picked to satisfy the pick order request. The computer system 110 can narrow down which candidate items to pick based on their locations in the warehouse. For example, if several of the items from the list 206 are located within a particular aisle, it can be preferred to build a pallet for that aisle since more of the list 206 can be fulfilled in one pallet build operation. This can be advantageous to reduce an amount of time required to fulfill the pick order request. In the example of FIG. 2, the computer system 110 can generate aisle-based lists 208.

The lists 208 indicate that aisle 1 contains 20 of item 106A, 40 of item 106B, 40 of item 106C, and 40 of item 106N. Aisle 2 contains 10 of item 106B and 20 of item 106D. These aisles can be selected for building the pick pallets since these aisles can have the closest full quantities of the items requested in the list 206. For example, aisle 1 contains the full requested quantities of items 106A, 106C, and 106N. Picking the full requested quantities in one pallet build operation can be advantageous to reduce an amount of time needed to fulfill the pick order request. It can be more advantageous than moving around the warehouse to pick up the items 106A-N in locations that are not proximate to each other.

Once the aisle-based lists 208 are generated, the computer system 110 can build pallets for each aisle using such lists 208 (step B, 202). Using the techniques described herein, the computer system 110 can identify aisle-based pallet builds 210. In this example, the computer system 110 determined that 3 pallets can be built. In aisle 1, a pallet identified as pallet 0 can be built with 40 of item 106N, 20 of item 106C, and 20 of item 106A. In aisle 1, another pallet identified as pallet 1 can be built with 40 of item 106B and 20 of item 106C. In aisle 2, a pallet identified as pallet 0 can be built with 10 of item 106D and 10 of item 102B.

The aisle-based pallet builds 210 can list the items 106A-N in an order in which they can be picked. Therefore, to build pallet 0 in aisle 1, the item 106N can be picked first, the item 106C can be picked second, and the item 106A can be picked last. As described herein, the items 106A-N can be picked from a back to a front of the warehouse, even though the items 106A-N are evaluated for picking from the front to the back of the warehouse. Thus, item 106N can be located near the back of the warehouse in aisle 1 whereas the item 106A can be located near the front of the warehouse in aisle 1.

After the computer system 110 generates the aisle-based pallet builds 210, the computer system 110 can determine whether there are opportunities to combine pallets from different aisles (step C, 204). The opportunities to combine can exist where one or more pallets per aisle can be built but are not full. In other words, the one or more pallets can include full or partial layers of items. The one or more pallets can also have a height that is less than a maximum height that the pallet can be.

Accordingly, the computer system 110 can generate final pallets list 212. The list 212 can indicate full pallets per aisle and/or pallets that can be combined from different aisles. In the example of FIG. 2, the computer system 110 identified an opportunity to combine the pallet 1 from aisle 1 with the pallet 0 from aisle 2. The list 212 therefore can indicate that a first pallet can be built in aisle 1 as pallet 0 and a second, combined pallet can be built to include pallet 1 from aisle 1 and pallet 0 from aisle 2. The resulting two pallets can be the final pallets shipped to a customer in order to fulfill the customer's pick order request.

Figure 3A:
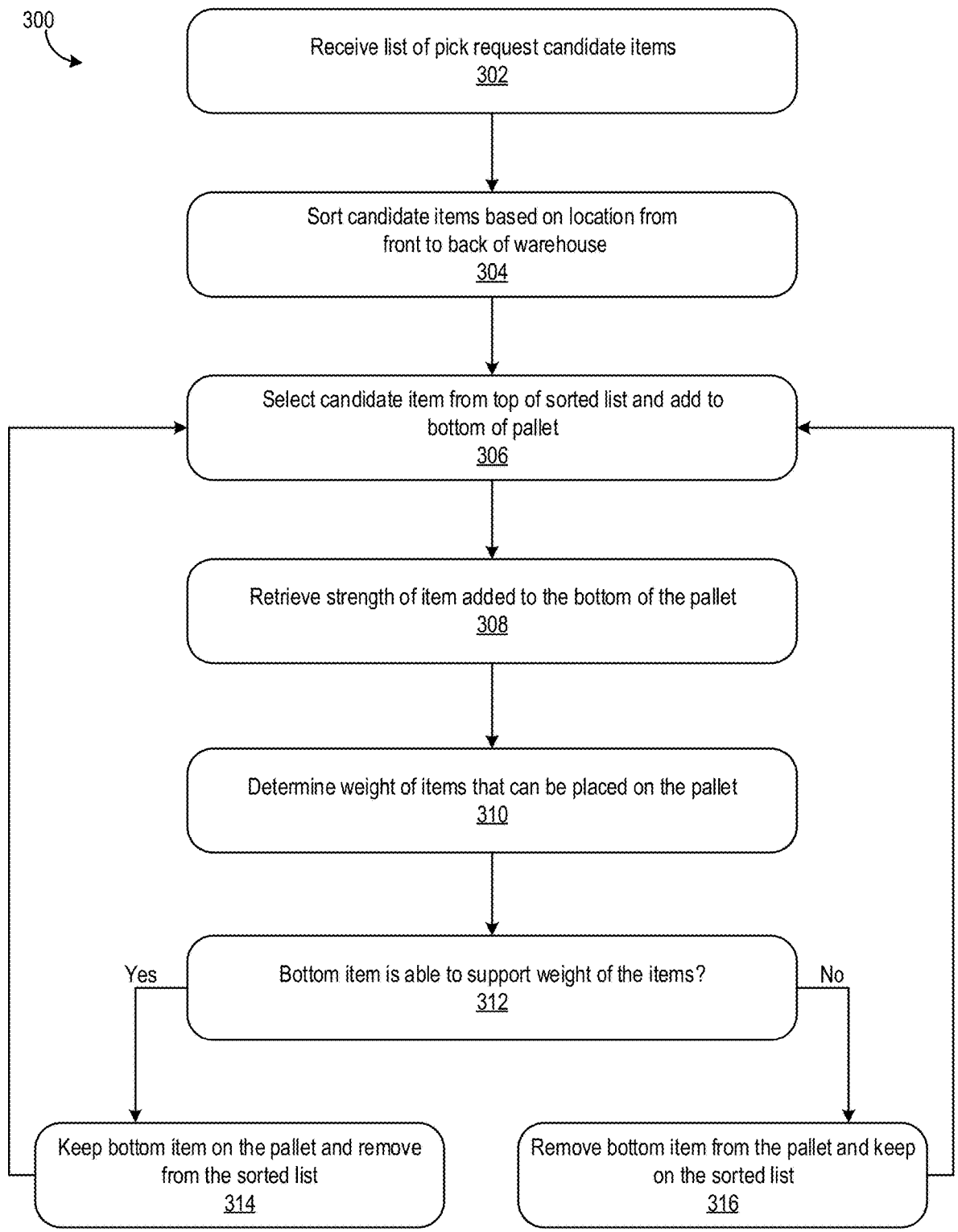
FIG. 3A is a flowchart of a process for determining a pick sequence for an aisle pallet.

FIG. 3A is a flowchart of a process 300 for determining a pick sequence for an aisle pallet. FIG. 3B is a block diagram for determining the pick sequence of FIG. 3A. The process 300 can be performed by the computer system 110 described herein. One or more blocks of the process 300 can also be performed by other computer systems, servers, and/or devices. For illustrative purposes, the process 300 is described from a perspective of a computer system.

Referring to the process 300 in FIG. 3A, the computer system can receive a list of pick request candidate items in 302. As shown in FIG. 3B, a candidate items list 320A includes items listed by their SKU and requested quantity. The list 320A indicates that 10 of item A are requested, 20 of item B are requested, 24 of item C are requested, and 10 of item D are requested. At a time that the list 320A is received, the computer system may not have a pallet pick order 322A determined. The pallet pick order can be populated/updated as the computer system continues through the process 300.

When the list 320A is received in 302 (refer to FIG. 3A), the computer system can also receive item information 318. The item information 318 can be received from a customer computing device. For example, the customer making a pick order request can transmit the item information 318 with the request. In some implementations, the item information 318 can be retrieved or received from a warehouse management system (WMS) once the pick order request is received at the warehouse.

The item information 318 can include information about each of the items that are requested to fulfill the pick order request. For each requested item, the item information 318 can include layer strength, layer weight, layer height, and a number of items per layer. The item information 318 can include additional or fewer details for each of the requested items. In the example of FIG. 3B, the item information 318 indicates that item A has a layer strength of 1,000 lb, a layer weight of 250 lb, a layer height of 12", and 10 items per layer. Thus, a layer of item A can support up to 1,000 lb placed on top of it. A layer of 10 items weighs 250 lb, and the layer has a maximum height of 12 inches. The item information 318 indicates that item B has a layer strength of 400 lb, a layer weight of 100 lb, a layer height of 15", and 20 items per layer. Item C has a layer strength of 200 lb, a layer weight of 100 lb, a layer height of 20", and 8 items per layer. In comparison to item A, item C can support 800 lb less weight than item A. Finally, the item information 318 indicates that item D has a layer strength of 750 lb, a layer weight of 250 lb, a layer height of 15", and 10 items per layer. The item information 318 can include one or more additional information about the items. For example, the information 318 can indicate length and width dimensions, gross item weight, net item weight, and/or measurements of a full pallet.

Referring to the process 300 in FIG. 3A, the computer system can sort the candidate items based on location from front to back of the warehouse in 304 (refer to step A, 326, in FIG. 3B). As shown in FIG. 3B, an updated candidate items list 320B can be generated by the computer system. Item A can be located at a front of the warehouse, item C can be located next closest to item A and the front of the warehouse, item D can be located next closest to item C and the front of the warehouse, and item B can be located farthest away from the front of the warehouse (e.g., at the back of the warehouse). At this point in the process 300, pallet pick order 322B may still be empty/not yet determined.

To determine an optimal pick sequence, the computer system can start by selecting a candidate item from the top of the sorted list and adding that candidate item to a bottom of a pallet build in 306 (refer to step B, 328, in FIG. 3B). As shown in FIG. 3B, item A, which is at the top of the candidate items list 320B, can be selected as a bottom layer in the pallet pick order 322C.

The computer system can then retrieve strength information for the item added to the bottom of the pallet in 308. For example, the computer system can access the item information 318 and identify that item A has a layer strength of 1,000 lb and a layer weight of 250 lb (refer to FIG. 3B). Since 10 of item A are requested and one layer contains 10 items, the computer system can determine that only one layer of item A can be added to the bottom of the pallet.

Next, the computer system can determine a weight of items that can be placed on the pallet in 310. The computer system can determine this using the item information 318. For example, the computer system can determine that one layer of the item A weighs 250 lb.

The computer system can determine whether the bottom item is able to support the weight of the other items in 312 (refer to step C, 330, in FIG. 3B). Thus, as shown in FIG. 3B, the computer system can determine whether the item C, which is next nearest to item A, can support the weight of item A (refer to candidate items list 320C). One layer of item C has a maximum layer strength of 200 lb, but the weight of one layer of item A has been identified as 250 lb. Therefore, the computer system can determine that item C cannot support the weight of item A without being damaged or crushed. Pallet pick order 322D has been updated to show that item C, although added on top of item A in the evaluation order 118, cannot sustain the weight of item A if picked in the pick order 120. Thus, the item C is crossed off and removed from pallet pick order 322E.

If the computer system determines that the bottom item is able to support weight of the item(s) placed above it, then the computer system can keep the bottom item on the pallet and remove that item from the sorted list in 314. The computer system can return to block 306 and repeat 306-312 until a structurally sound pallet is built with the candidate items.

If the bottom item cannot support the weight, then the computer system can remove the bottom item from the pallet and keep that item on the sorted list in 316. The computer system can return to block 306 and repeat 306-312 until a structurally sound pallet is built with the candidate items. As shown in the pallet pick order 322D in FIG. 3B, item C cannot support the weight of item A. Thus, item C is removed from pallet pick order 322E and kept on candidate list 320D.

The computer system can evaluate the next nearest item to item A, which is item D. The computer system can evaluate placing item D below item A, as shown in the pallet pick order 322E, to determine whether item D can be added below item A (step D, 332). As described above, the computer system can determine whether item D, which can support up to 750 lb, is able to support the 250 lb of item A without being crushed. Since the item D can support the weight of item A, item D can be kept in the pallet pick order as an item to pick before item A in the pick order 120.

Item D can be removed from candidate items list 320E, which now includes only items C and B. The computer system can determine that a second pallet needs to be built with the remaining items C and B. This determination can depend on whether the first pallet built using the pallet pick order 322E can be at a maximum height threshold, whether adding any additional layers to the first pallet can cause the first pallet to exceed the maximum height threshold, and/or whether the combination of layers of items D and A can support any additional weight without being crushed. Thus, the computer system can build the second pallet using the techniques described herein (step E, 334). A pallet pick order 324A can be generated for the second pallet.

In the example of FIG. 3B, the pallet pick order 324A indicates that item B can be picked first, which is closer to the back of the warehouse than item C, and used as a bottom layer for the second pallet. Since each layer of item C contains 8 items, 3 layers of item C can be required. 3 layers of item C can weigh 300 lb (refer to the item information 318). One layer of item B has a layer strength of 400 lb. Thus, the layer of item B can support the weight of 3 layers of item C without being crushed. As a result, the second pallet can be built from the back of the warehouse to the front of the warehouse, by placing the layer of item B on the bottom of the pallet and the 3 layers of item C on top of the layer of item B.

FIGS. 4A-D is a flowchart of a process 400 for determining an optimal pallet build using the techniques described herein. The process 400 can be performed by the computer system 110 described herein. One or more blocks of the process 400 can also be performed by other computer systems, servers, and/or devices. For illustrative purposes, the process 400 is described from a perspective of a computer system.

Referring to the process 400 depicted in FIGS. 4A-D, the computer system can receive a pick order request that identifies items to be picked in 402. The pick order request can include an order number, an owner identifier, item(s) identifier(s), quantity of each requested item, a flag indication of whether mixing the owner with other owners is allowed, and any temperature or other storage conditions. The pick order request can also identify any constraints, such as a pallet type, maximum width, maximum height, maximum weight, and/or a rush order indicator.

The computer system can identify pick items in the warehouse that can be used to fulfill the pick order request in 404. As described herein, the computer system can identify items that are closest to each other in location in the warehouse. Items that are closer together can be picked in less time and with less travel, which can improve warehouse efficiency. In identifying the items that can be picked, the computer system can also identify, for each item, an owner identifier, item identifier, identifier date (e.g., if the item is on a pick line), location name, temperature zone, storage conditions, platform type (e.g., CHEP, GMA, EUR, etc.), case/item quantity, an indication of whether the item is on a pick line, and/or an indication of whether the item must be used first in a pallet build to satisfy a pick.

Next, the computer system can separate the identified pick items based on aisles that they are located within (406). The computer system can generate aisle-based lists having the identified pick items in 408. As described herein, one or more pallets can be built per aisle. The one or more pallets can be built in the aisle from a back of the warehouse to a front of the warehouse in order to improve travel time, energy usage, and overall pallet build operations.

Each aisle-based list can be sorted from front to back of the warehouse in 410. Thus, the identified pick items in each aisle can be sorted such that an item at a top of the aisle-based list is located at a front of the aisle that is closest to the front of the warehouse and an item at a bottom of the aisle-based list is located at a back of the aisle that is closest to the back of the warehouse. As described throughout this disclosure, a pallet can be built from the back to the front of the warehouse, however the computer system can evaluate an order to pick the items to build the pallet in reverse order, from the front to the back of the warehouse.

Still referring to the process 400 in FIGS. 4A-D, the computer system can select one of the sorted aisle-based lists in 412. Once the list is selected, the computer system can start a new pick pallet in 414. The computer system can then determine how to sequence items within the aisle on the new pick pallet. For example, the computer system can add a pick item that is next closest to the front of the warehouse from the sorted aisle-based list to a bottom layer of the pick pallet (416). The computer system can add a first item closest to the front of the warehouse to the bottom layer. If an item is already on the pallet, then the computer system can add a next item closest to the front of the warehouse to the bottom layer.

The computer system can determine whether preexisting layers above the new layer exceed a weight threshold for the new layer in 418. The computer system can determine whether the new layer can support the weight of the preexisting layers. As described herein, each layer can have a maximum amount of weight that it can support. When layers exceeding that maximum weight are placed on top of the layer, the layer can be damaged and/or crushed.

Therefore, if the computer system determines that preexisting layers above the new layer would exceed the maximum weight threshold for the new layer in 418, the computer system can determine that the new layer should not be added to a sequence of layers for the pick pallet in 420. The computer system can return to block 416. The computer system can repeat blocks 416-418 for a next pick item closest to the first item that was evaluated and the front of the warehouse.

If, on the other hand, the computer system determines that the preexisting layers above the new layer do not exceed the weight threshold for the new layer in 418, then the computer system can determine that the new layer can potentially be placed beneath the preexisting layers without being crushed or otherwise damaged. Thus, the computer system can determine whether addition of the new layer would exceed a height threshold for the pick pallet in 422. The height threshold can be set in the pick order request. The height threshold can be based on customer preferences and/or warehouse standards. As an example, the height threshold can be 60 inches.

If adding the new layer would cause the pick pallet to exceed the height threshold, then the computer system can return to block 420. After all, the new layer should not be added to the pick pallet. If, on the other hand, adding the new layer would not cause the pick pallet to exceed the height threshold, the computer system can add the new layer to the sequence of layers for building the pick pallet in 424.

Once the new layer is added to the sequence of layers, the new layer can be removed from the sorted aisle-based list in 426. The computer system can determine whether it has reached an end of the sorted aisle-based list in 428. In other words, the computer system can determine whether it has evaluated each item in the aisle-based list and/or added each item to the sequence of layers for the pick pallet.

If the computer system has not reached the end of the sorted aisle-based list, then the computer system may evaluate one or more items still remaining on the list. Thus, the computer system can return to block 416. The computer system can add a new item at the top of the list to a bottom layer of the pick pallet and perform the evaluation in blocks 418-428 for that new item. The computer system can repeat blocks 416-428 until the computer system has reached the end of the sorted aisle-based list.

If the computer system has reached the end of the sorted aisle-based list, then the computer system can determine that it has finished the pick pallet in 430. In other words, a pick order sequence has been determined for the particular pick pallet, which includes items from the sorted aisle-based list.

The computer system can then determine whether there are any additional pick items on the sorted aisle-based list in 432. In some implementations, the finished pick pallet may not include all of the items that are on the aisle-based list. This scenario can occur when the finished pick pallet is at the maximum height threshold and/or the layers of the finished pick pallet cannot support any additional weight. Thus, one or more additional pallets may be built for the particular aisle with any additional pick items in that aisle.

If there are other pick items on the sorted aisle-based list that have not been included in the finished pick pallet in 432, then the computer system can return to block 414 and start a new pick pallet. The computer system can repeat blocks 414-432 until all of the additional items in the sorted aisle-based list are arranged into pallet build sequences.

If there are no other pick items on the sorted aisle-based list, then the computer system can determine whether there are any more aisle-based lists in 434. If there are more aisle-based lists, the computer system can return to block 412 and select another of the aisle-based lists. The computer system can then repeat blocks 412-434 until there are no more aisle-based lists to build pallets with.

If there are no more aisle-based lists in 434, then the computer system can determine that the pick order request can be completed. After all, all the items in the request have been arranged in pallet build sequences. The pallets can therefore be built using the pallet build sequences determined in blocks 412-434. Accordingly, the computer system can output sequence(s) for layers of the pick pallet(s) for each aisle-based list in 436. As described herein, in some implementations, the computer system can generate one pallet build sequence per aisle. In some implementations, the computer system can generate multiple pallet build sequences per aisle.

The output generated in 436 can include an order number associated with the pick order request, a set of pallets to build for the pick order request, and steps or instructions for building the pallets. For each of the pallets to build, the output can include SKUs for items going on the pallet, locations of each SKU, a pick/build order, a number of items/cases to pick for each SKU, any required equipment to build the pallet, and/or an estimated height of the pallet once built.

The computer system can also determine whether to combine partial pallets from different aisle-based lists in 438. In some implementations, a pallet can be built for an aisle with any remaining items that did not fit onto a first pallet for that aisle. This can result in a partial pallet. The partial pallet may not have full layers. In some implementations, the partial pallet may have full layers but may not be at a maximum height for the pallet. Thus, additional layers and/or items can be added to the partial pallet.

If the computer system determines that there are no partial pallets from the different aisle-based lists that can be combined in 438, the process 400 can stop. In some implementations, one or more of the aisle-based lists can include partial pallets, however the partial pallets may not be able to be combined because a final combined pallet may exceed a maximum height threshold for the pallet. In some implementations, the partial pallets may not be combined because one or more of the pallets may not be able to sustain the weight of the other pallets. As a result, one or more of the pallets may be damaged or otherwise crushed. Combining the partial pallets can therefore compromise pallet structural integrity.

However, if the computer system determines that partial pallets from one or more of the different aisle-based lists can be combined, then the computer system can generate output of sequence(s) for combining the partial pallets in 440. The output can indicate a sequence to layer the partial pallets into a final pallet. The output can also indicate a set of coordinates indicating where each partial layer and/or loose item can be placed on the pallet. The coordinates can, for example, start with (0, 0) in a lower left corner of the pallet from a perspective of a warehouse worker or warehouse vehicle building the pallet.

The output can from blocks 436 and 40 can be provided to a warehouse vehicle and/or a device of a warehouse worker. As described in reference to FIG. 1, the output can be provided when the warehouse vehicle and/or the warehouse worker request to start a new task.

Figure 5A:
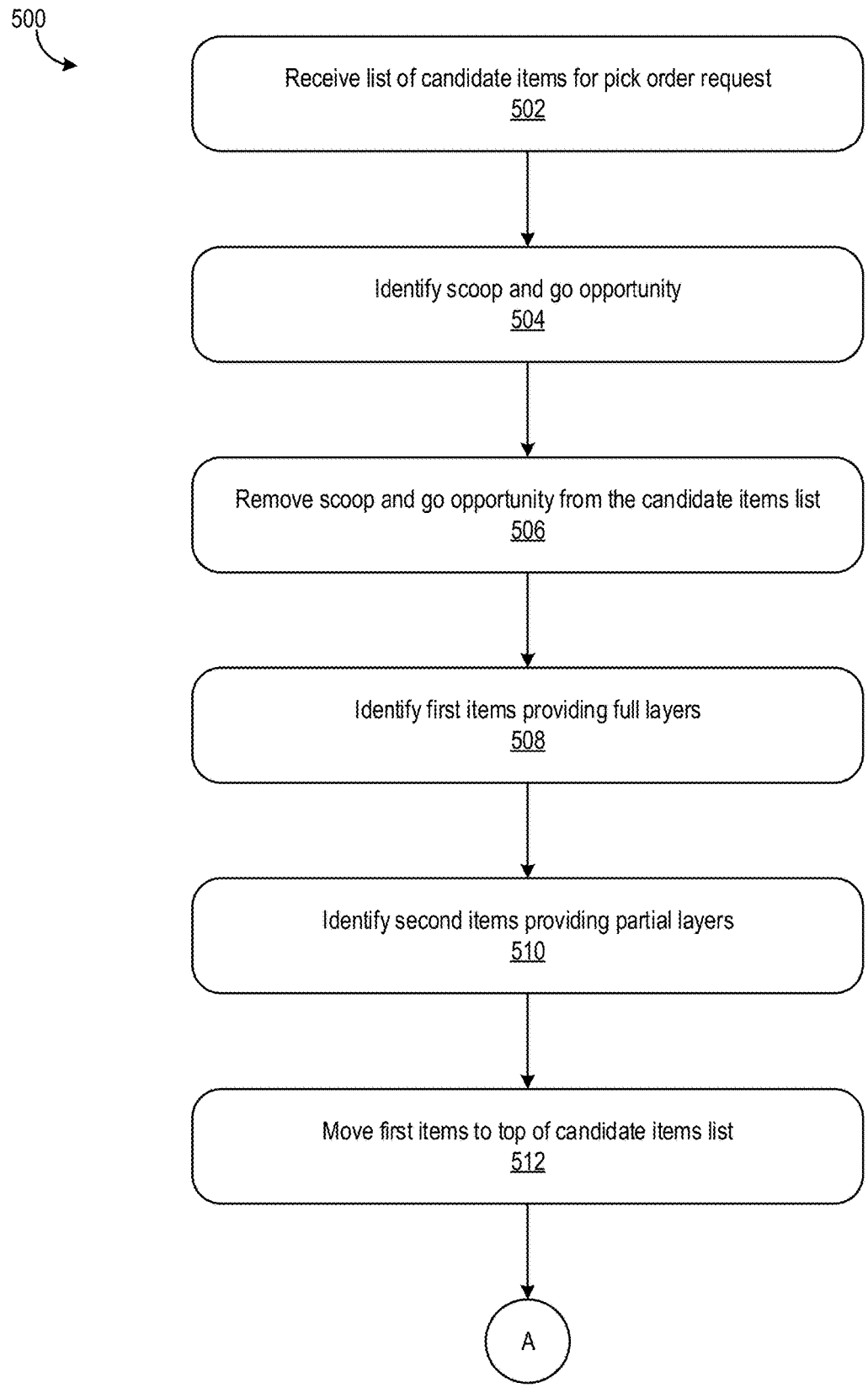
FIGS. 5A-B is a flowchart of a process for determining an optimal pallet build using scoop and go, full, and partial layers.
Figure 5B:
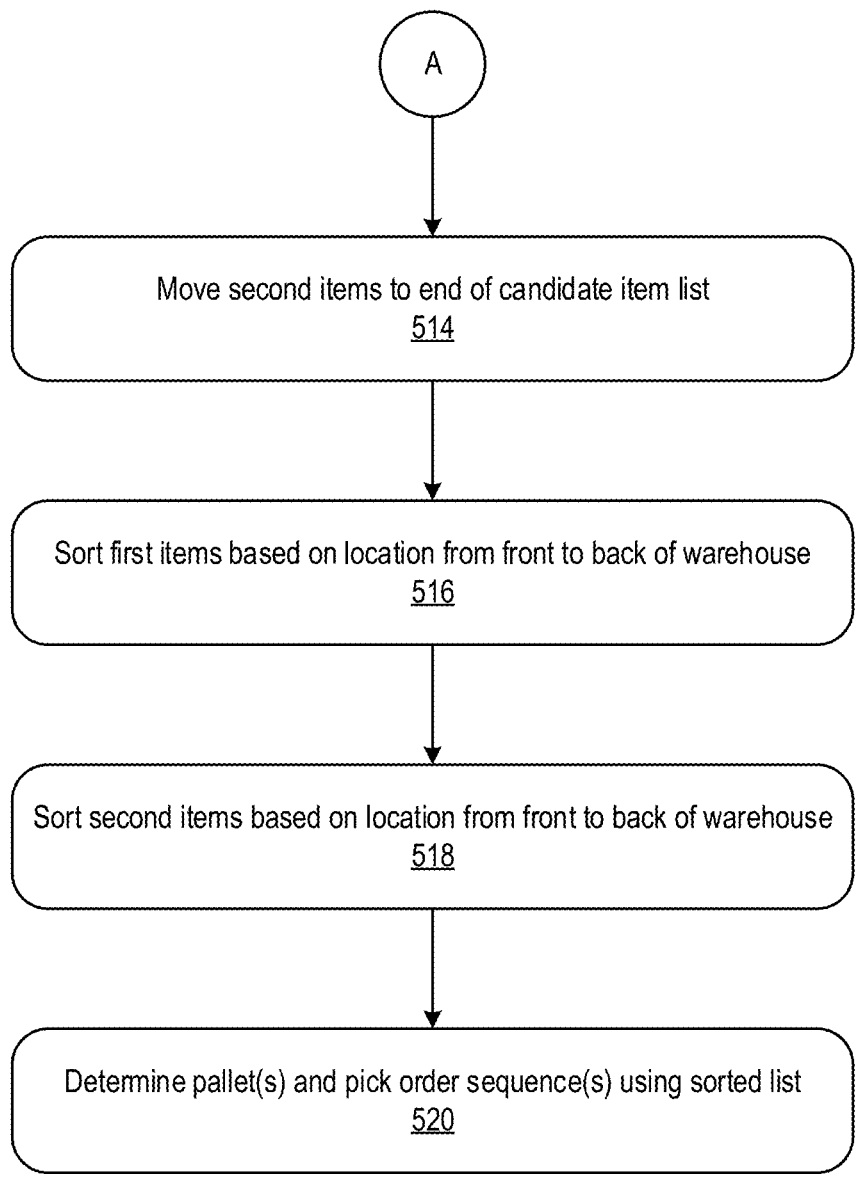

FIGS. 5A-B is a flowchart of a process 500 for determining an optimal pallet build using scoop and go, full, and partial layers. The process 500 can be performed by the computer system 110 described herein. One or more blocks of the process 500 can also be performed by other computer systems, servers, and/or devices. For illustrative purposes, the process 500 is described from a perspective of a computer system. FIG. 5C is a block diagram for determining the optimal pallet build of FIGS. 5A-B.

Referring to the process 500 in FIGS. 5A-C, the computer system can receive a list of candidate items for a pick order request in 502. As shown in FIG. 5C, candidate items list 522A can indicate items to be picked based on their SKU (e.g., identifier, barcode, label, QR code). The candidate items list 522A can also indicate a layer type for each of the candidate items. For example, item A is a partial layer, item B is a full layer, item C is a partial layer, item D is a full layer, and item E is a scoop and go layer.

The computer system can identify a scoop and go opportunity in 504 (refer to step A, 526, in FIG. 5C). A scoop and go opportunity can exist when a number of cases or items needed from a source pallet is greater than 50% of a total number of cases on that source pallet. Scoop and go opportunities can also exist in a variety of different scenarios, for example, when the number of cases or items needed from the source pallet is greater than 50%, 40%, 30%, 20%, 10%, 5%, etc. of a quantity remaining on the source pallet. As another example, each physical mixed pallet build can have at most one scoop and go item. However, there often can be multiple potential scoop and go items for a particular mixed pallet. In such scenarios, the computer system can identify an order line item with a highest quantity, and select that item as the scoop and go opportunity. As an illustrative example, if source pallet A has 50 cases on it and the mixed pallet needs 30, and source pallet B has 100 cases on it and the mixed pallet needs 60, the computer system can choose source pallet B as the scoop and go opportunity. Selecting source pallet B can be advantageous to minimize a number of cases that have to be moved on the source pallet B to build the mixed pallet, in comparison to moving cases on the source pallet A to build the mixed pallet.

Selecting the scoop and go opportunity as a base or bottom layer for a pallet can be advantageous because it can reduce an amount of time, energy, and need to move around the warehouse in order to collect additional quantities of the requested item. Therefore, identifying a scoop and go opportunity can improve warehouse efficiency by reducing travel and build time.

If a scoop and go opportunity is identified, the scoop and go opportunity can be used to build the pallet, as shown in pallet pick order 524A in FIG. 5C. Thus, the scoop and go opportunity can be used as a base or bottom layer for the pallet. Item E is identified as a scoop and go opportunity because item E has a quantity of items (e.g., cases) needed from a source pallet that is at least or greater than 50% of a quantity of the item E on that source pallet. Item E can remain as the bottom layer of the pallet, even though sequencing of layers above this scoop and go item can change.

In some implementations, there may not be a scoop and go opportunity. In such scenarios, the computer system can proceed to block 508.

Once the scoop and go opportunity is identified in 504, the computer system can remove the scoop and go opportunity from the candidate list in 506. As shown in FIG. 5C, candidate list 522B can therefore be updated to include items A-D.

Next, it can be easier and more efficient to build a pallet with full layers on top of each other rather than with layers of varying heights and sizes. It can be preferred to sequence full layers above the scoop and go bottom layer and then partial layers on top of the full layers. Accordingly, the computer system can identify first items that provide full layers in 508. The computer system can also identify second items that provide partial layers in 510. The computer system can then move the first items to a top of the candidate items list in 512 (refer to step B, 528, in FIG. 5C). Similarly, the computer system can move the second items to an end of the candidate item list (514). As shown in FIG. 5C, the candidate items list 522C includes the items B and D at the top of the list 522C, since they are full layers. The items A and C have been moved to the end of the list 522C because they are partial layers.

The computer system can sort the first items based on their location from a front to a back of the warehouse in 516. The computer system can also sort the second items based on their location from the front to the back of the warehouse in 518 (refer to step C, 530, in FIG. 5C). The items can be sorted within their groupings because, as described throughout this disclosure, building a pallet from the back to the front of the warehouse can improve warehouse efficiency, reduce travel time, and reduce time needed to build the pallet.

Using the sorted list of candidate items, the computer system can determine pallet(s) and pick order sequence(s) in 520, as described throughout this disclosure (refer to FIGS. 2-4). Therefore, the computer system can first determine pallet build sequences for the full layers. The computer system can then determine pallet build sequences for the partial layers (refer to step D, 532, in FIG. 5C).

As demonstrated in FIG. 5C, the computer system can determine pallet pick order 524B. Item E can be picked first since it is the scoop and go opportunity. Item B can be picked next and layered on top of the item E since item B is a full layer and can support weight of the items D, C, and A. Item D can then be picked and layered on top of the item B since item D is a full layer and can support weight of the items C and A. Item C can be picked next and layered on top of item D because there are no remaining full layers to sequence. Of the partial layers, item C and be layered above item D and beneath item A because item C can support weight of the item A. Finally, item A can be layered on a top of the pallet since it is the last remaining partial layer and is a weight that can be supported by the items E, B, D, and C. As a reminder, items such as item E and B can also be closest to the back of the warehouse while item A can be located closest to the front of the warehouse. The pallet pick order 524B therefore can ensure that the pallet is built efficiently from the back to the front of the warehouse while using minimum travel time and energy.

Figure 6:
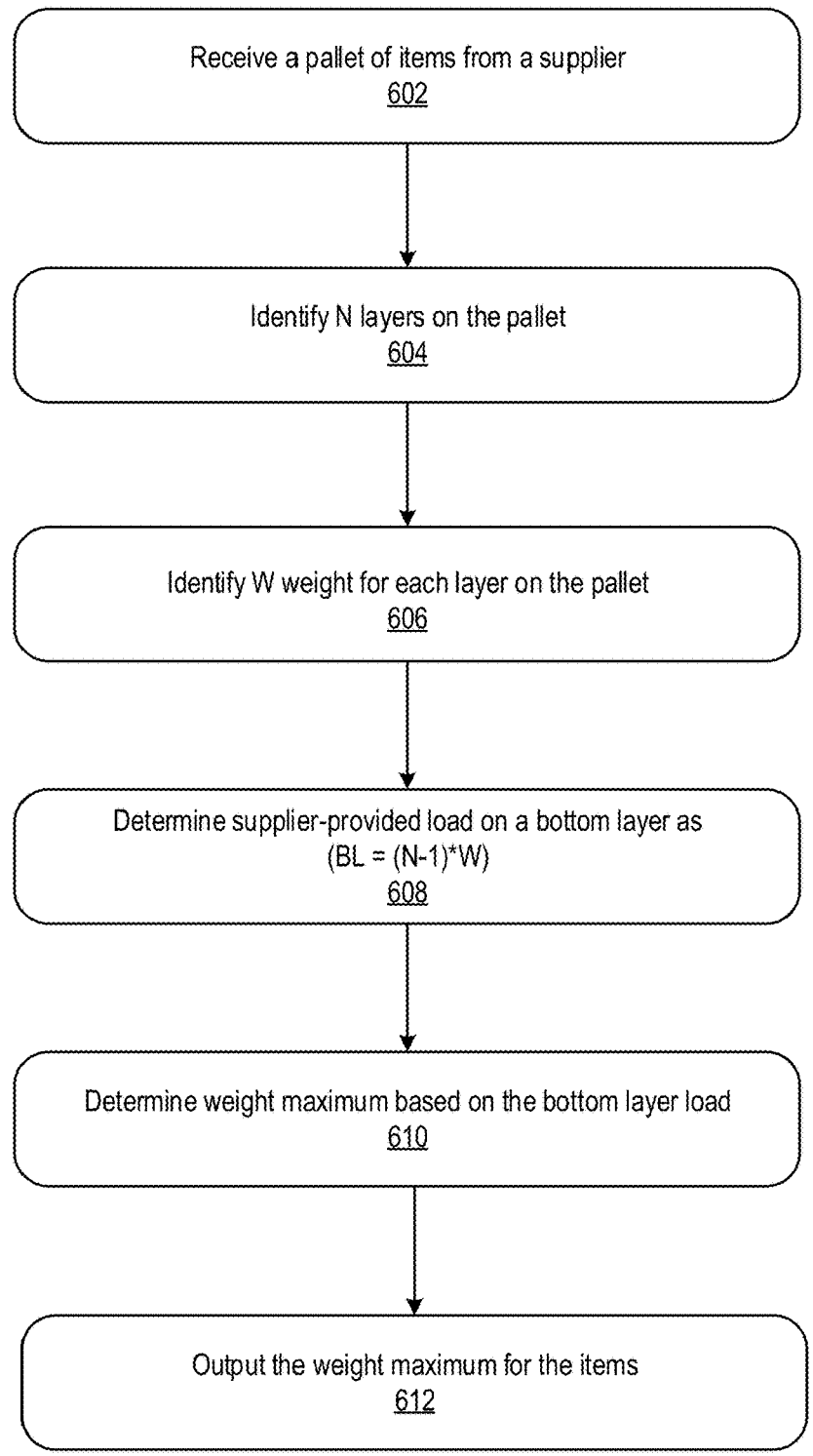
FIG. 6 is a flowchart of a process for determining a maximum amount of weight that a layer can support.

FIG. 6 is a flowchart of a process 600 for determining a maximum amount of weight that a layer can support. The maximum amount of weight can be inferred based on available data, as described further below. In some implementations, the process 600 can be performed at one time for a layer of items. For example, the process 600 can be performed when the layer of items first arrives at the warehouse. In some implementations, the process 600 can be performed at predetermined times in order to determine whether conditions of the layer of items have changed in such a way that can alter the maximum amount of weight that the layer can support. The determined maximum amount of weight can then be stored and used for any pick order request that request such items. The process 600 can be performed by the computer system 110 described herein. One or more blocks of the process 600 can also be performed by other computer systems, servers, and/or devices. For illustrative purposes, the process 600 is described from a perspective of a computer system.

Referring to the process 600, the computer system can receive a pallet of items from a supplier in 602. The supplier can send a same quantity of items on each pallet over time. In such scenarios, the process 600 can be performed once when a pallet is received instead of every time that a pallet is received from the supplier. In some implementations, the supplier can send pallets having different quantities of the item and/or number of layers of the item. In such scenarios, the computer system can take a maximum or average of the received pallets in order to perform the process 600. When the pallet of items is received from the supplier, the computer system can also receive an SKU or other identifier used to identify the items on the pallet. In some implementations, the computer system can receive additional information, such as a size of each item on the pallet, a weight of each item on the pallet, and storage conditions for the pallet.

The computer system can then identify N number of layers on the pallet in 604. In some implementations, the computer system can receive information from the supplier indicating the number of layers on the pallet. In some implementations, the number of layers can be inferred using imaging techniques. For example, images of the pallet can be captured once the pallet enters the warehouse. Using image processing techniques, the computer system can determine how many layers appear in the image data. In some implementations, a warehouse worker can count the number of layers and provide that count to the computer system.

The computer system can identify W weight for each layer on the pallet in 606. As mentioned, the weight information can be provided to the computer system by the supplier. For example, the computer system can receive information indicating weight of each item on the pallet. The computer system can also receive information indicating a total quantity of the items on the pallet. The computer system can multiply the weight for each item with the total quantity of the items to determine an overall weight. The overall weight can be divided by the N number of layers to determine W weight per layer. In some implementations, the pallet can be weighed upon arrival at the warehouse. The computer system can receive this weight value, divide it by the N number of layers, and subtract a weight of the pallet structure itself to determine the W weight per layer. In some implementations, the computer system can receive the W weight per layer from the supplier and/or a warehouse management system (WMS).

Next, the computer system can determine a supplier-provided load on a bottom layer in 608. This load can be identified using an equation as follows: (N−1)*W. The computer system can therefore determine how much weight the supplier had loaded on top of the bottom layer on the pallet. This load can be used to determine how much weight any of the layers can support without being damaged or otherwise crushed. After all, if the bottom layer can support weight of all layers above it, then any of the layers can support a maximum of whatever weight was placed on top of the bottom layer.

As a simple example, a pallet can have 5 layers and each layer can weigh 100 lb. A bottom layer, layer 1, can have a supplier-provided load of (5−1)*100, which amounts to 400 lb. Thus, the bottom layer, layer 1, can support 400 lb without being damaged or otherwise crushed. If a top layer on the pallet, layer 5, is switched with layer 1 to become the new bottom layer, then the layer 5 can also support 400 lb without being damaged or crushed, since every layer's load can be inferred as the same.

Accordingly, the computer system can determine a weight maximum based on the bottom layer load in 610. The computer system can determine how much weight any of the layers on the pallet can support without being crushed. The computer system can also determine the weight maximum within a margin parameter. For example, the computer system can multiply the bottom layer load by a weighted margin multiplier to represent a maximum amount of weight that can be placed on top of the layer. In some implementations, the weighted margin multiplier can be 1.2 or some value that is less than 2.0. In some implementations, the weighted margin multiplier can be a percentage. For example, the multiplier can be no more than 10-20% more than the supplier-provided load.

The computer system can then output the weight maximum for the items in 612. Each item on the pallet can have the same weight maximum, as described above. The weight maximum can be used in subsequent processes to determine how much weight a layer of the item can support without being damaged or otherwise crushed.

The process 600 can be advantageous because it does not require actually crushing the layer of items in a field test. The process 600 can also be used to dynamically adjust how much weight the layer of items can support based on how packaging or other characteristics of that layer may change over time. Adjusting the output from the process 600 may not require the entire process 600 to be repeated. Instead, only one or more of the blocks 602-612 can be performed in order to update the determined weight maximum for the items.

Figure 7:
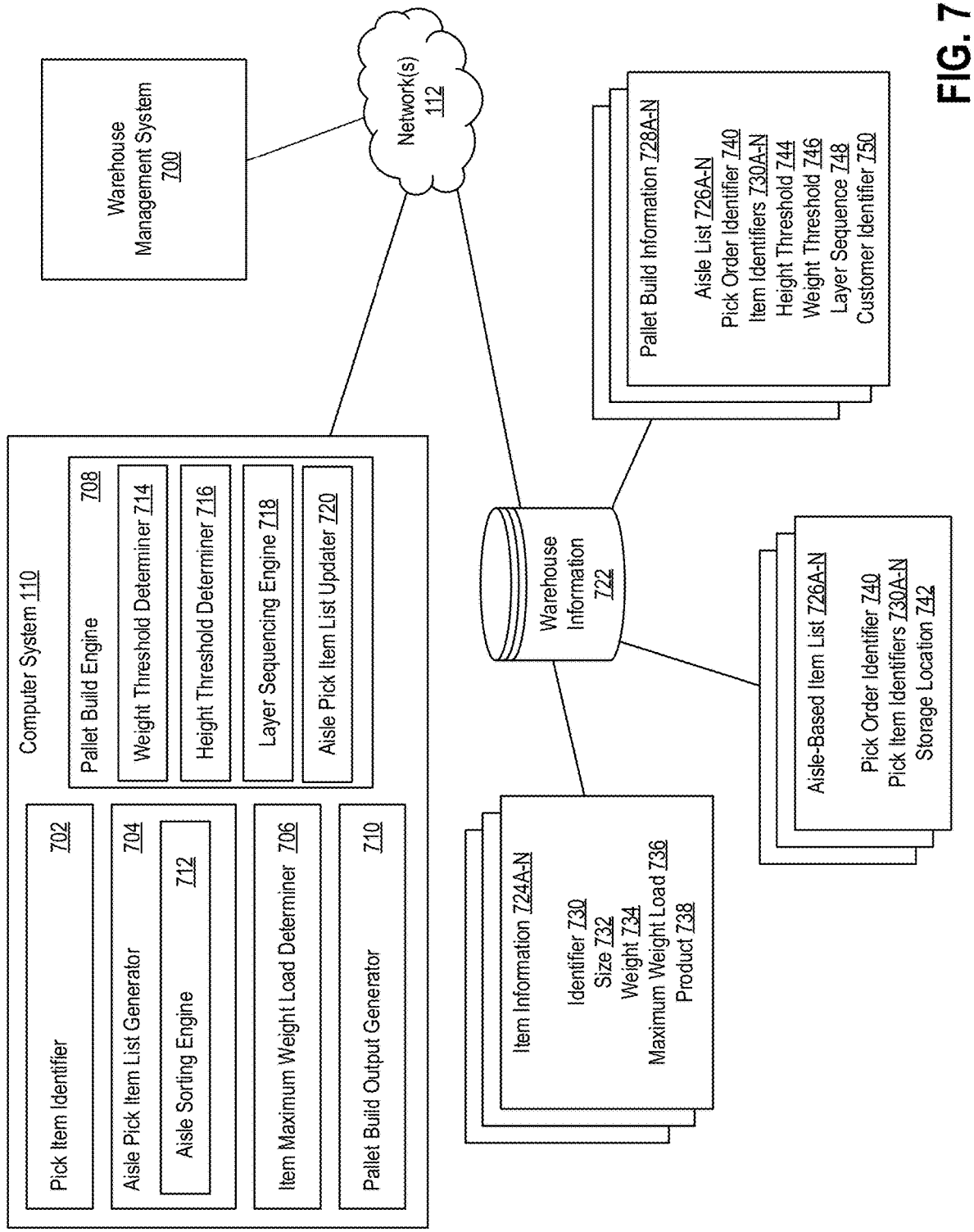
FIG. 7 is a system diagram of one or more components used to perform the techniques described herein.

FIG. 7 is a system diagram of one or more components used to perform the techniques described herein. As described herein, the computer system 110 can communicate with one or more components, computing systems, servers, and/or data stores via the network(s) 112 (e.g., wired and/or wireless communication), including warehouse management system (WMS) 700 and warehouse information data store 722. In some implementations, the computer system 110 and the WMS 700 can be a same computer system, network of computers, and/or server(s).

The WMS 700 can be configured to perform operations that manage the warehouse. For example, the WMS 700 can receive information about inbound and outbound items and pallets. The WMS 700 can receive pick order requests, put away orders, and other operations within the warehouse. The WMS 700 can be configured to update information that is stored in the warehouse information data store 722. The WMS 700 can also make determinations about where to store items in the warehouse, profiling items, and assigning tasks to warehouse workers and warehouse vehicles. The WMS 700 can perform one or more other operations that are associated with managing tasks and actions within the warehouse.

In some implementations, the WMS 700 can receive a pick order request. The WMS 700 can transmit the request to the computer system 110. In some implementations, the computer system 110 can receive the pick order request from a customer computing device.

The computer system 110 can be configured to determine optimal pick pallet build operations as described herein. The computer system 110 can include a pick item identifier 702, an aisle pick item list generator 704, an item maximum weight load determiner 706, a pallet build engine 708, and a pallet build output generator 710.

Figure 4A:
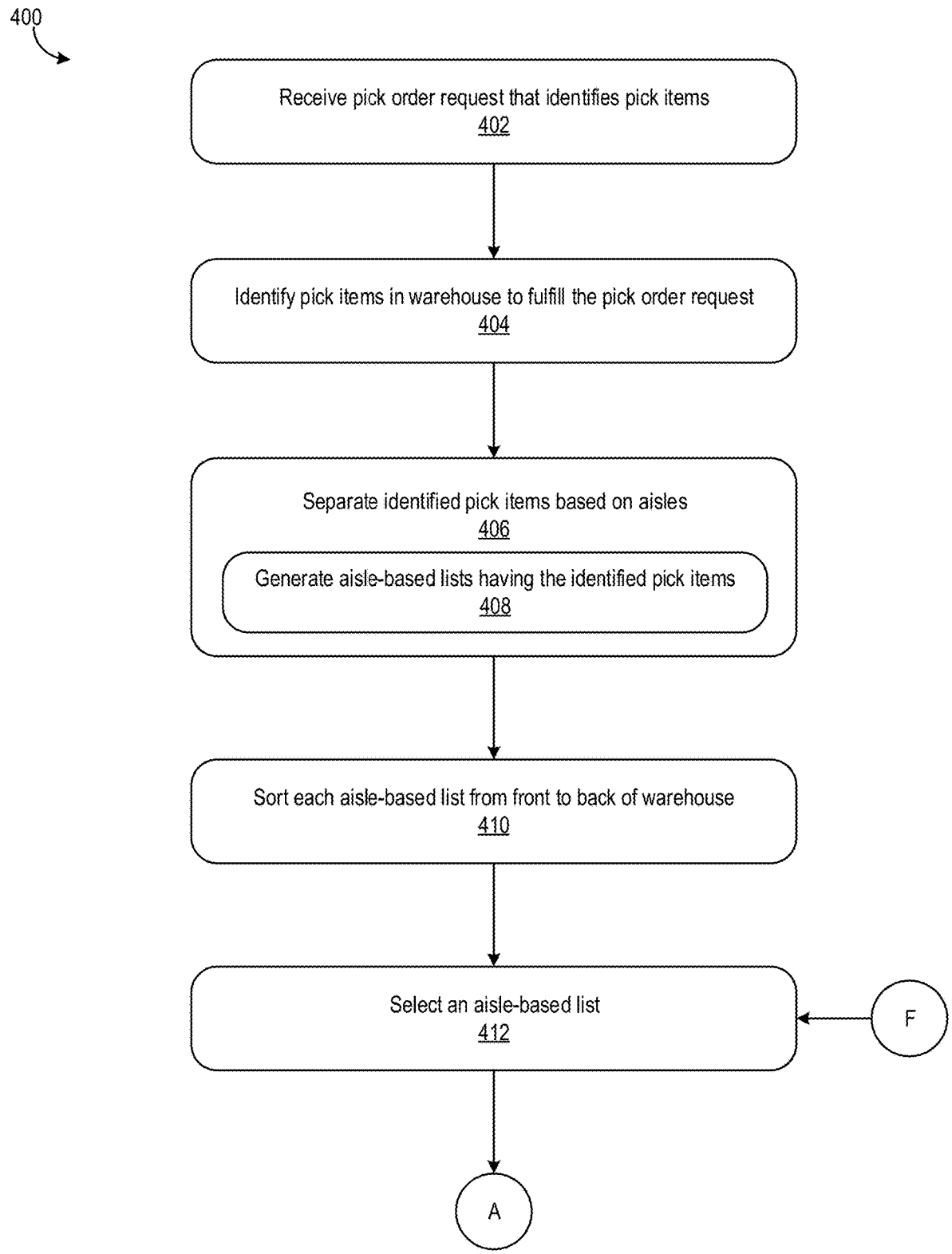
FIGS. 4A-D is a flowchart of a process for determining an optimal pallet build using the techniques described herein.

The pick item identifier 702 can be configured to determine which items in the warehouse can be picked to fulfill a pick order request (e.g., refer to block 404 in FIG. 4A). The identifier 702 can identify source pallets containing the items to be picked to fulfill the request. The identifier 702 can also identify locations of such source pallets. The identifier 702 can be configured to identify source pallets having a greatest quantity of the requested items and source pallets that are closest to each other in location. As a result, a pallet can be built more efficiently. A warehouse vehicle may pick up the items that are closest to each other instead of traveling all over the warehouse to various different locations to collect the items. Since the items can be picked up close to each other, less energy can be used to transport the pallet around the warehouse. Additionally, since the items can be picked up close to each other, building the pallet can require less time. Picking up items that are closest in quantity to the requested item quantities can also be advantageous so that the pallet can be built with as many full layers as possible. The more full layers, the fewer partial layers and the fewer resources (e.g., computational resources, time, energy) that may be needed in order to build the pallet to fulfill the pick order request.

The aisle pick item list generator 704 can be configured to generate aisle-based lists, as described herein (e.g., refer to blocks 406-410 in FIG. 4A). Each aisle-based list can include candidate items located within that aisle that can fulfill the pick order request. Moreover, the aisle pick list generator 704 can include an aisle sorting engine 712. The aisle sorting engine 712 can be configured to sort items in the aisle-based list based on their location from a front to a back of the warehouse.

The item maximum weight load determiner 706 can be configured to infer how much weight a layer of a particular item can support without being damaged or otherwise crushed, as described in reference to the process 600 in FIG. 6. The determiner 706 can determine a maximum load for an item when the item is requested in the pick order request. The determiner 706 can also determine the maximum load at a time before the pick order request is received, for example, when the item is delivered to the warehouse by a supplier.

The pallet build engine 708 can be configured to determine, for each aisle-based list, one or more pallets to build to fulfill the pick order request (e.g., refer to blocks 412-434 in FIGS. 4A-D). The engine 708 can use the techniques described throughout this disclosure to determine optimal pallet builds. To determine the pallet builds, the engine 708 can also include a weight threshold determiner 714, a height threshold determiner 716, a layer sequencing engine 718, and an aisle pick item list updater 720.

Figure 4B:
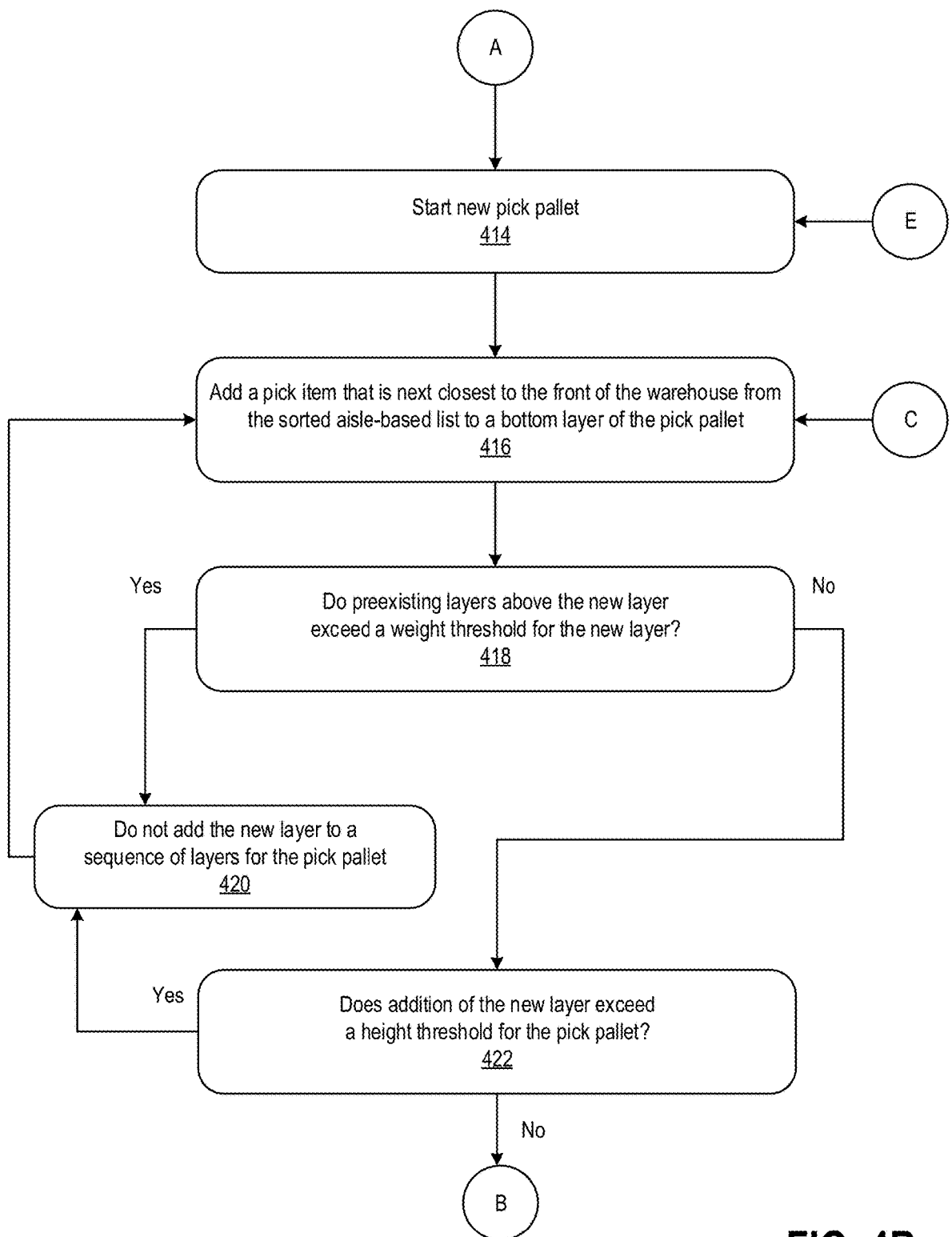

The weight threshold determiner 714 can be configured to determine how much weight each layer of items can support if placed as a bottom layer on a pallet (e.g., refer to blocks 308-316 in FIG. 3A; blocks 418-420 in FIG. 4B). The determiner 714 can also identify which layers of items can be stacked on top of each other without causing items on lower layers to be damaged or otherwise crushed.

The height threshold determiner 716 can be configured to determine how many and which layers can be stacked on the pallet without exceeding a predefined maximum height for the pallet (e.g., refer to block 422 in FIG. 4B). In some implementations, the determiner 716 can also make a determination of whether additional pallets need to be built in order to stack any remaining pallets that would have otherwise caused the first pallet to exceed the maximum height.

Figure 4C:
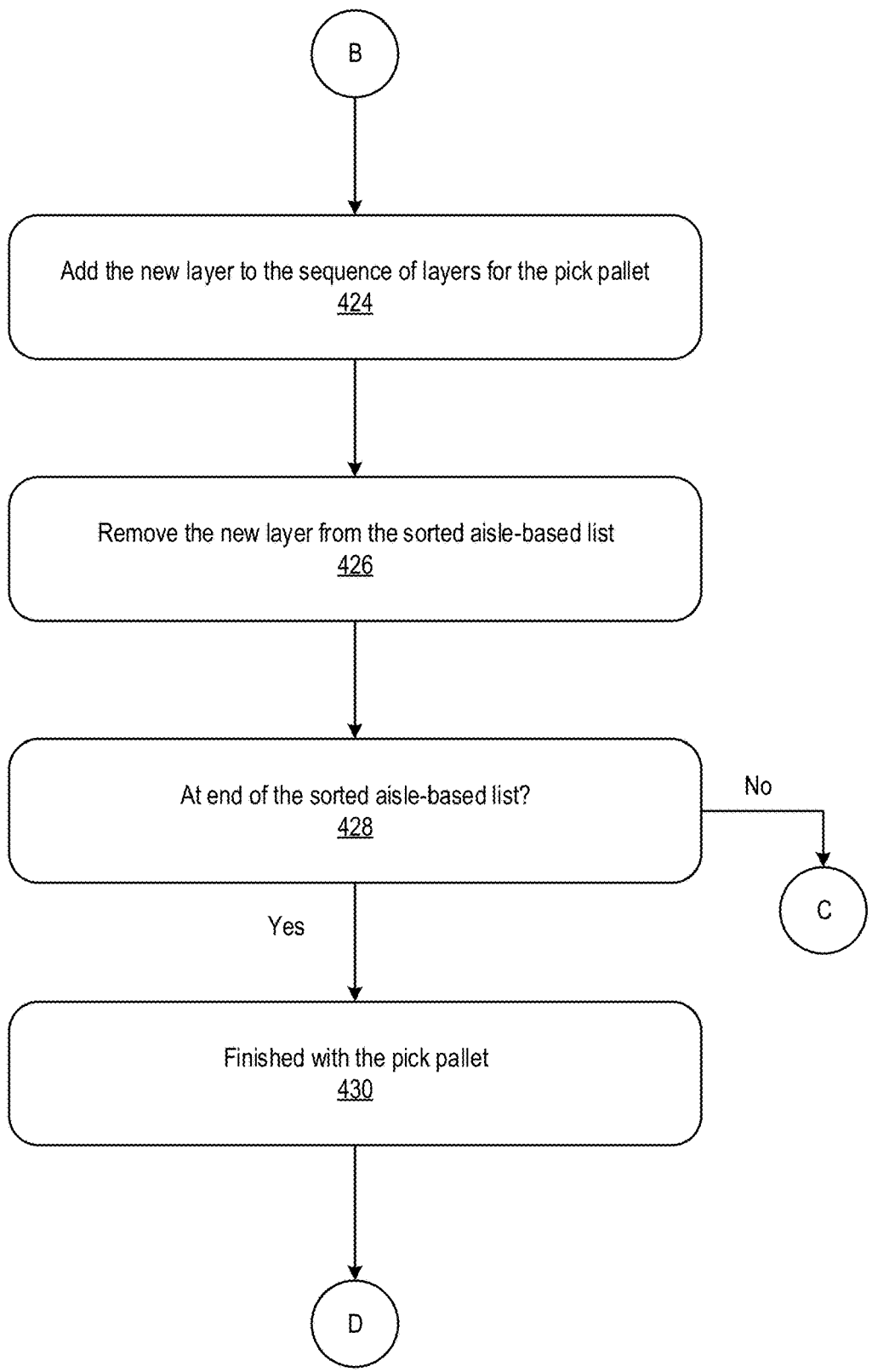

The layer sequencing engine 718 can be configured to generate and/or update a pick sequence/order per pallet (e.g., refer to blocks 314-316 in FIG. 3A; refer to pallet pick orders 322A-E, 324A in FIG. 3B; refer to blocks 420 and 424 in FIGS. 4B-C; refer to pallet pick orders 524A-B in FIG. 5C). As described throughout this disclosure, the pick sequence can list the items from back to front of the warehouse, where the items from the back of the warehouse are to be picked up first and the items from the front of the warehouse are to be picked up last. As described herein, the pick order can be a reverse of an evaluation order (e.g., refer to evaluation order 118 and pick order 120 in FIG. 1).

The aisle pick item list updater 720 can be configured to update the aisle pick item list whenever an item is removed from the list and added to the layer sequencing for the pallet build (e.g., refer to blocks 314-316 in FIG. 3A; refer to candidate item lists 320A-E in FIG. 3B; refer to block 426 in FIG. 4C; refer to candidate item lists 522A-C in FIG. 5C).

Figure 4D:
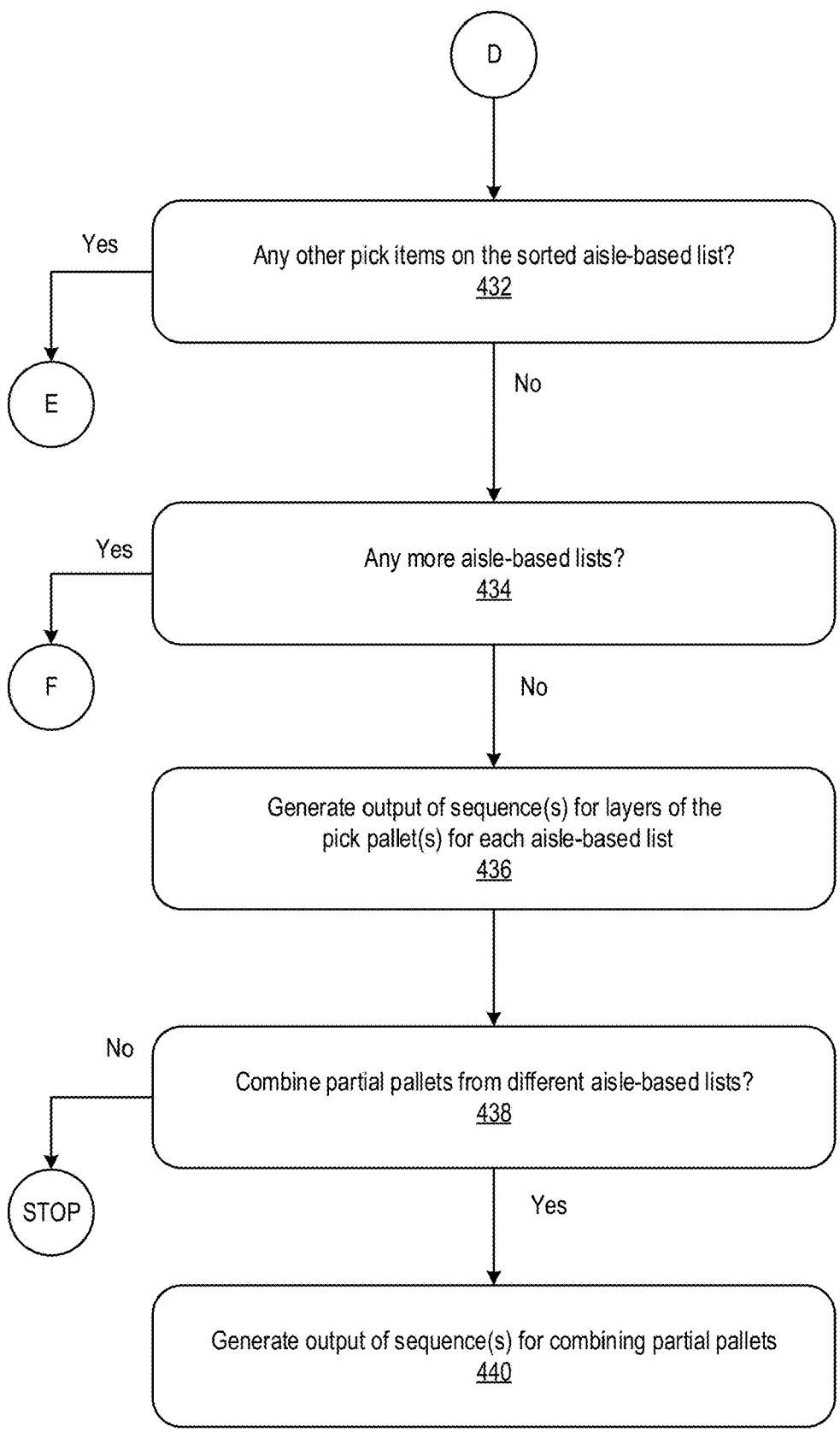

Moreover, the pallet build output generator 710 can be configured to generate output that instructs a warehouse worker or warehouse vehicle an order by which to pick the items and build the pallet(s) (e.g., refer to blocks 436 and 440 in FIG. 4D). The generator 710 can also collect additional information that can be used to assist the warehouse worker or warehouse vehicle in building the pallet(s), as described throughout this disclosure.

The warehouse information data store 722 can store item information 724A-N, aisle-based lists 726A-N, and pallet build information 728A-N. The item information 724A-N can include, for each item, an identifier 730, a size 732, a weight 734, a maximum weight load 736, and a product 738 (e.g., refer to the item information 318 in FIG. 3B). The identifier 730 can be a SKU, barcode, label, QR code, or another identifier, as described throughout this disclosure. The size 732, weight 734, and the maximum weight load 736 can be determined by one or more components of the computer system 110, as described herein. When the computer system 110 makes such determinations, the computer system 110 can store the determinations for the associated item in the warehouse information data store 722. Moreover, the product 738 can identify a type of the item.

The aisle-based item list 726A-N can include information associated with each of the aisle-based lists that are generated by components of the computer system 110. For example, for each of the lists 726A-N, a pick order identifier 740, pick item identifiers 730A-N, and storage location 742 can be identified and stored. The lists 726A-N can therefore include associations between different items 724A-N that can be selected to build pallets for each of the aisles with each aisle. The lists 726A-N can also associate the items in the aisle with the pick order request using the identifier 740. The lists 726A-N can also include the storage location 742, which can indicate where the aisle is located within the warehouse.

Finally, the pallet build information 728A-N can be generated for each pallet that can be built to fulfill the pick order request. For each pallet build 728A-N, the aisle list 726A-N, pick order identifier 740, item identifiers 730A-N, height threshold 744, weight threshold 746, layer sequence 748, and customer identifier 750 can be stored. The pallet build information 728A-N can provide associations with the item information 724A-N and the aisle-based item lists 726A-N. The height threshold 744 can indicate a maximum height of the pallet. The height threshold 744 can also indicate a current height of the pallet based on the layer sequence 748. The weight threshold 746 can indicate how much weight each layer can support. The weight threshold 746 can also indicate how much weight is currently on the pallet. Moreover, components of the computer system 110 can use the pallet build information 728A-N to generate output about how to build the pallets to fulfill the pick order request.

Figure 8:
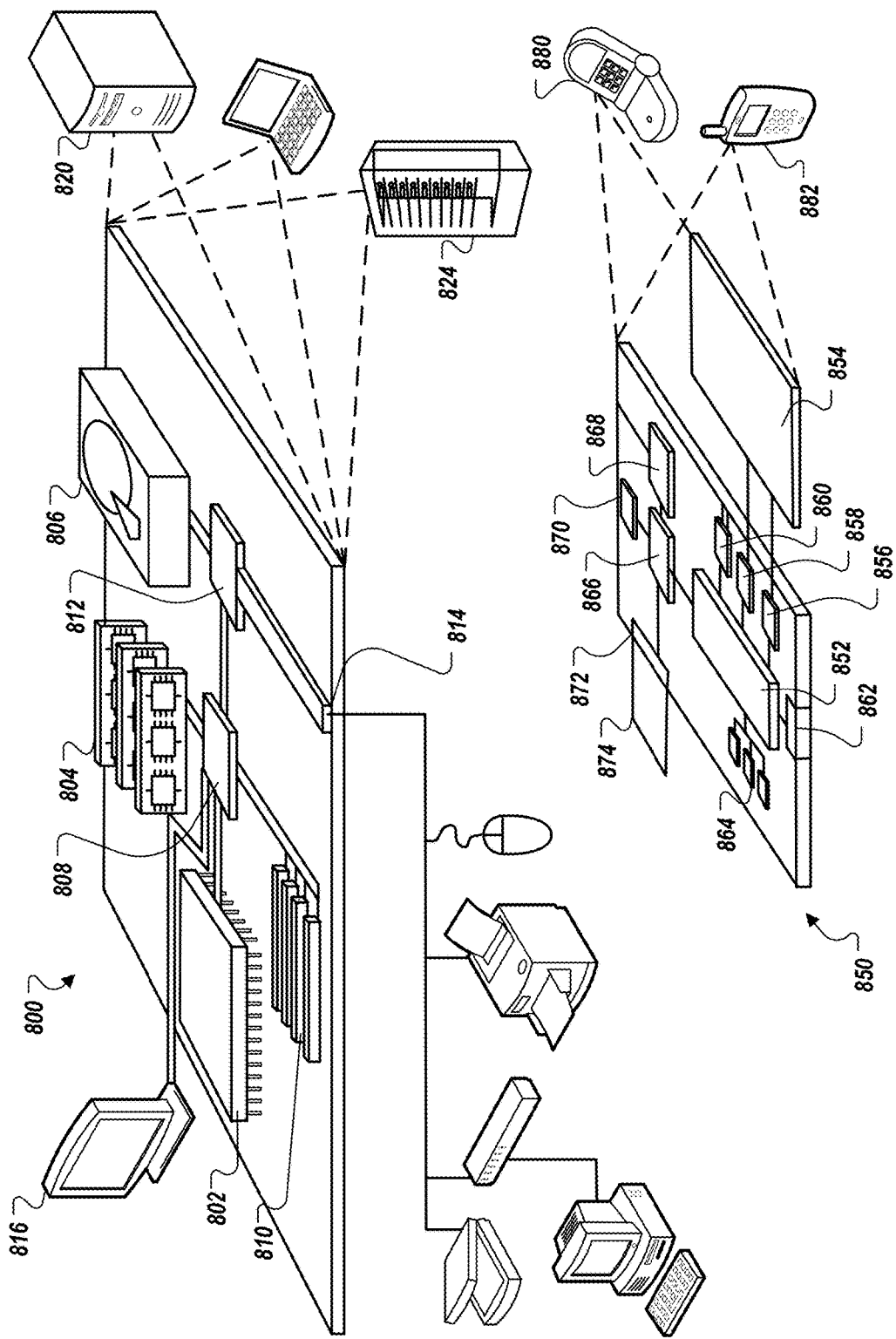
FIG. 8 is a schematic diagram that shows an example of a computing device and a mobile computing device that can be used to perform the techniques described herein.

FIG. 8 is a schematic diagram that shows an example of a computing device 800 and a mobile computing device that can be used to perform the techniques described herein. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for determining a pallet build sequence in an automated warehouse, the method comprising:
    receiving, by a computing system, a pick order request, wherein the pick order request includes a list of items to be picked and a quantity of each of the items to be picked;
    identifying, by the computing system and based on the pick order request, candidate pick items in the automated warehouse that can be used to fulfill the pick order request;
    grouping, by the computing system, the identified candidate pick items based on aisles;
    generating, by the computing system, aisle-based lists for each of the groups of identified candidate pick items;
    sorting, by the computing system, each of the aisle-based lists based on a location of each of the identified candidate pick items in each of the groups relative to a front of the automated warehouse, wherein a first candidate pick item closest to the front of the automated warehouse is put at a top of the aisle-based list;
iteratively performing the following for each of the aisle-based lists:
  selecting, by the computing system, a first candidate pick item at the top of the aisle-based list;
  adding, by the computing system, the first candidate pick item to a bottom layer of a pallet;
  retrieving, by the computing system, strength information of the first candidate pick item;
  determining, by the computing system, an amount of weight of candidate pick items from the aisle-based list that can be layered on top of the first candidate pick item;
  determining, by the computing system, whether the first candidate pick item is able to support the determined amount of weight based on the determined amount of weight being less than the strength information;
  in response to determining that the first candidate pick item is able to support the determined amount of weight, keeping, by the computing system, the first candidate pick item in a pick sequence as the bottom layer of the pallet and removing the first candidate pick item from the aisle-based list; and
  in response to determining that the first candidate pick item is not able to support the determined amount of weight, removing, by the computing system, the first candidate pick item from the pick sequence as the bottom layer of the pallet and keeping the first candidate pick item on the aisle-based list;
  generating, by the computing system, pallet build instructions based on the pick sequence for the aisle-based list, wherein the pallet build instructions indicate that a subset of the layers of the pallet have a same build order permitting them to be assembled at interchangeable positions within the pallet when building the pallet according to the pallet build instructions; and
transmitting, to an automated layer picker, data representing the pallet build instructions that, when executed by the automated layer picker, cause the automated layer picker to automatically perform operations that include (i) moving to an aisle in the automated warehouse that has a relationship with the aisle-based list, (ii) picking items in the aisle based on the pick sequence for the aisle-based list, and (iii) assembling the picked items on the pallet based on a set of coordinates in the pallet build instructions that indicate locations on the pallet where each of the picked items should be placed,
wherein the strength information includes a maximum weight load that the first candidate pick item can support without being crushed, wherein the maximum weight load is determined, by the computing system, in a process comprising:
  determining a supplier-provided load on a bottom layer of a pallet having the first candidate pick item, wherein the supplier-provided load is a weight for each layer multiplied by one less than a number of layers on the pallet; and
  determining the maximum weight load based on applying a margin threshold multiplier to the supplier-provided load.

2. The method of claim 1, further comprising:
receiving, by the computing system and from a warehouse vehicle, a request for a new task; and
transmitting, by the computing system and to the warehouse vehicle, the pick sequence for each of the pallets to build, wherein the pick sequence lists candidate items to be picked in an order from a back of the automated warehouse to the front of the automated warehouse.

3. The method of claim 1, further comprising determining, by the computing system and based on the sorted aisle-based list, a number of pallets to build per aisle.

4. The method of claim 1, wherein the maximum weight load is determined, by the computing system, in a process that further comprises:
receiving data representing the pallet having the first candidate pick item from a supplier;
identifying, based on processing the received data, the number of layers of the first candidate pick item on the pallet; and
identifying, based on processing the received data, the weight for each layer on the pallet.

5. The method of claim 1, wherein the margin threshold multiplier is 1.2.

6. The method of claim 1, further comprising, in response to determining that the first candidate pick item is able to support the determined amount of weight:
selecting, by the computing system, a second candidate pick item at the top of the aisle-based list;
adding, by the computing system, the second candidate pick item to the bottom layer of the pallet beneath the first candidate pick item;
retrieving, by the computing system, strength information of the second candidate pick item;
determining, by the computing system, an amount of weight of candidate pick items from the aisle-based list that can be layered on top of the first candidate pick item;
determining, by the computing system, whether the second candidate pick item is able to support a weight of the first candidate pick item;
in response to determining that the second candidate pick item is able to support the weight, keeping, by the computing system, the second candidate pick item in the pick sequence as the bottom layer of the pallet and removing the second candidate pick item from the aisle-based list; and
in response to determining that the second candidate pick item is not able to support the weight, removing, by the computing system, the second candidate pick item from the pick sequence as the bottom layer of the pallet and keeping the second candidate pick item on the aisle-based list.

7. The method of claim 1, wherein the first candidate pick item is closest to the front of the automated warehouse.

8. The method of claim 1, further comprising:
determining, by the computing system, whether the pallet having the first candidate pick item as the bottom layer exceeds a height threshold;
in response to determining that the pallet exceeds the height threshold, removing, by the computing system, the first candidate pick item from the pick sequence as the bottom layer and keeping the first candidate pick item in the aisle-based list; and
in response to determining that the pallet does not exceed the height threshold, keeping, by the computing system, the first candidate pick item in the pick sequence as the bottom layer and removing the first candidate pick item from the aisle-based list.

9. The method of claim 8, wherein the height threshold is 60 inches.

10. The method of claim 1, further comprising:
determining, by the computing system, whether pick sequences are generated for partial pallets based on the aisle-based lists; and
in response to determining that pick sequences are generated for partial pallets, generating, by the computing system, instructions to combine one or more of the partial pallets.

11. The method of claim 1, further comprising:
identifying, by the computing system and for each of the aisle-based lists, a scoop and go candidate pick item that has at least a minimum threshold quantity of the candidate pick item to fulfill the pick order request;
moving, by the computing system, the scoop and go candidate pick item to the pick sequence as the bottom layer of the pallet;
removing, by the computing system, the scoop and go candidate pick item from the aisle-based list;
identifying, by the computing system, first items in the aisle-based list that are full layers;
identifying, by the computing system, second items in the aisle-based list that are partial layers;
moving, by the computing system, the first items to the top of the aisle-based list;
moving, by the computing system, the second items to an end of the aisle-based list;
sorting, by the computing system, the first items based on location from the front to a back of the automated warehouse;
sorting, by the computing system, the second items based on location from the front to the back of the automated warehouse; and
determining, by the computing system and for each of the first items and the second items, first and second orders in which the first and second items can be picked to build the pallet having the scoop and go candidate pick item as the bottom layer.

12. The method of claim 11, wherein the minimum threshold quantity of the candidate pick item comprises a current available quantity on a source pallet for the candidate pick item having half or more of a pick quantity for the candidate pick item in the pick order request.

13. The method of claim 11, further comprising:
identifying, by the computing system, a plurality of scoop and go candidate pick items from a plurality of source pallets; and
selecting, by the computing system, one of the plurality of scoop and go candidate pick items based at least in part on the selected scoop and go candidate pick item having a greatest quantity of the scoop and go candidate pick item on a source pallet from amongst the source pallets for the plurality of scoop and go candidate pick items.

14. The method of claim 1, further comprising:
generating, by the computing system, pallet build instructions based on the pick sequence for the aisle-based list; and
transmitting, to a computing device of a warehouse worker, data representing the pallet build instructions that, when executed by the computing device, cause the computing device to output, in a graphical user interface (GUI) display at the computing device, the pallet build instructions, wherein the pallet build instructions include, for each of the aisle-based lists, (i) directions that route the warehouse worker to locations of items to be picked based on the pick sequence for the aisle-based list and (ii) sets of coordinates indicating where each picked item should be placed on the pallet to assemble the pallet based on the pick sequence.

15. A system for determining a pallet build sequence in an automated warehouse, the system comprising:
one or more processors; and
memory storing instructions, that when executed by the one or more processors, cause the one or more processors to perform operations comprising:
receiving a pick order request, wherein the pick order request includes a list of items to be picked and a quantity of each of the items to be picked;
identifying, based on the pick order request, candidate pick items in the automated warehouse that can be used to fulfill the pick order request;
grouping the identified candidate pick items based on aisles;
generating aisle-based lists for each of the groups of identified candidate pick items;
sorting each of the aisle-based lists based on a location of each of the identified candidate pick items in each of the groups relative to a front of the automated warehouse, wherein a first candidate pick item closest to the front of the automated warehouse is put at a top of the aisle-based list;
iteratively performing the following for each of the aisle-based lists:
selecting a first candidate pick item at the top of the aisle-based list;
adding the first candidate pick item to a bottom layer of a pallet;
retrieving strength information of the first candidate pick item;
determining an amount of weight of candidate pick items from the aisle-based list that can be layered on top of the first candidate pick item;
determining whether the first candidate pick item is able to support the determined amount of weight based on the determined amount of weight being less than the strength information;
in response to determining that the first candidate pick item is able to support the determined amount of weight, keeping the first candidate pick item in a pick sequence as the bottom layer of the pallet and removing the first candidate pick item from the aisle-based list; and
in response to determining that the first candidate pick item is not able to support the determined amount of weight, removing the first candidate pick item from the pick sequence as the bottom layer of the pallet and keeping the first candidate pick item on the aisle-based list;
generating pallet build instructions based on the pick sequence for the aisle-based list, wherein the pallet build instructions indicate that a subset of the layers of the pallet have a same build order permitting them to be assembled at interchangeable positions within the pallet when building the pallet according to the pallet build instructions; and
transmitting, to an automated layer picker, data representing the pallet build instructions that, when executed by the automated layer picker, cause the automated layer picker to automatically perform operations that include (i) moving to an aisle in the automated warehouse that has a relationship with the aisle-based list, (ii) picking items in the aisle based on the pick sequence for the aisle-based list, and (iii) assembling the picked items on the pallet based on a set of coordinates in the pallet build instructions that indicate locations on the pallet where each of the picked items should be placed, wherein the strength information includes a maximum weight load that the first candidate pick item can support without being crushed, wherein the maximum weight load is determined, by the computing system, in a process comprising:

determining a supplier-provided load on a bottom layer of a pallet having the first candidate pick item, wherein the supplier-provided load is a weight for each layer multiplied by one less than a number of layers on the pallet; and determining the maximum weight load based on applying a margin threshold multiplier to the supplier-provided load.

16. The system of claim 15, wherein the operations further comprise:

receiving, from a warehouse vehicle, a request for a new task; and transmitting, to the warehouse vehicle, the pick sequence for each of the pallets to build, wherein the pick sequence lists candidate items to be picked in an order from a back of the automated warehouse to the front of the automated warehouse.

17. The system of claim 15, wherein the operations further comprise determining, based on the sorted aisle-based list, a number of pallets to build per aisle.

18. The system of claim 1, wherein the operations further comprise determining the maximum weight load based on:

receiving data representing the pallet having the first candidate pick item from a supplier;

identifying, based on processing the received data, the number of layers of the first candidate pick item on the pallet; and identifying, based on processing the received data, the weight for each layer on the pallet.

19. The system of claim 15, wherein the operations further comprise, in response to determining that the first candidate pick item is able to support the determined amount of weight:

selecting a second candidate pick item at the top of the aisle-based list;

adding the second candidate pick item to the bottom layer of the pallet beneath the first candidate pick item;

retrieving strength information of the second candidate pick item;

determining an amount of weight of candidate pick items from the aisle-based list that can be layered on top of the first candidate pick item;

determining whether the second candidate pick item is able to support a weight of the first candidate pick item;

in response to determining that the second candidate pick item is able to support the weight, keeping the second candidate pick item in the pick sequence as the bottom layer of the pallet and removing the second candidate pick item from the aisle-based list; and in response to determining that the second candidate pick item is not able to support the weight, removing the second candidate pick item from the pick sequence as the bottom layer of the pallet and keeping the second candidate pick item on the aisle-based list.

20. The system of claim 15, wherein the operations further comprise:

generating pallet build instructions based on the pick sequence for the aisle-based list; and transmitting, to a computing device of a warehouse worker, data representing the pallet build instructions that, when executed by the computing device, cause the computing device to output, in a graphical user interface (GUI) display at the computing device, the pallet build instructions, wherein the pallet build instructions include, for each of the aisle-based lists, (i) directions that route the warehouse worker to locations of items to be picked based on the pick sequence for the aisle-based list and (ii) sets of coordinates indicating where each picked item should be placed on the pallet to assemble the pallet based on the pick sequence.

* * * * *

UNITED STATES PATENT AND TRADEMARK OFFICE
CERTIFICATE OF CORRECTION

PATENT NO. : 11,755,994 B2
APPLICATION NO. : 17/330328
DATED : September 12, 2023
INVENTOR(S) : Thomas Eugene Murphy and Daniel Thomas Wintz It is certified that error appears in the above-identified patent and that said Letters Patent is hereby corrected as shown below:

In the Specification

In Column 3, Line 35, after "Embodiment 3 is the method" insert -- or --.

In Column 7, Lines 38-39, after "the disclosed innovation provides a" insert -- method --.

In Column 11, Lines 13-14, delete "up last to make" and insert -- last to make up --, therefor.

In Column 18, Line 27, delete "40" and insert -- 440 --, therefor.

In Column 20, Line 7, delete "and" and insert -- can --, therefor.

Signed and Sealed this
Twenty-sixth Day of December, 2023

Katherine Kelly Vidal
Director of the United States Patent and Trademark Office